United States Patent [19]
Smoorenburg

[11] Patent Number: 5,522,144
[45] Date of Patent: Jun. 4, 1996

[54] TIRE-WEAR DETECTOR

[76] Inventor: Anthony Smoorenburg, P.O. Box 1716, Conroe, Tex. 77305

[21] Appl. No.: 194,078

[22] Filed: Feb. 9, 1994

[51] Int. Cl.$^6$ .................................................. G01B 5/255
[52] U.S. Cl. ................................... 33/203.14; 33/203.12
[58] Field of Search ....................... 33/203.14, 203, 33/203.12, 203.21

[56] References Cited

U.S. PATENT DOCUMENTS

| | | | |
|---|---|---|---|
| 2,261,342 | 11/1941 | Darton | 33/203.14 |
| 2,883,762 | 4/1959 | MacMillan | 33/203.14 |
| 3,905,120 | 9/1975 | Butler | 33/203.14 |
| 4,430,802 | 2/1984 | Cole | 33/203.12 |
| 5,129,149 | 7/1992 | Colarelli, III et al. | 33/203.14 |

*Primary Examiner*—Christopher W. Fulton
*Attorney, Agent, or Firm*—Larry Mason Lee

[57] ABSTRACT

A dynamic wheel alignment condition system for measuring the side movement of both wheels attached to a given axle over a given distance for both steerable and non-steerable wheels. Reference is taken from the footprint of both tires as they rotate over floor plate assemblies. Computerized calculation of data and video display of results is provided.

3 Claims, 23 Drawing Sheets

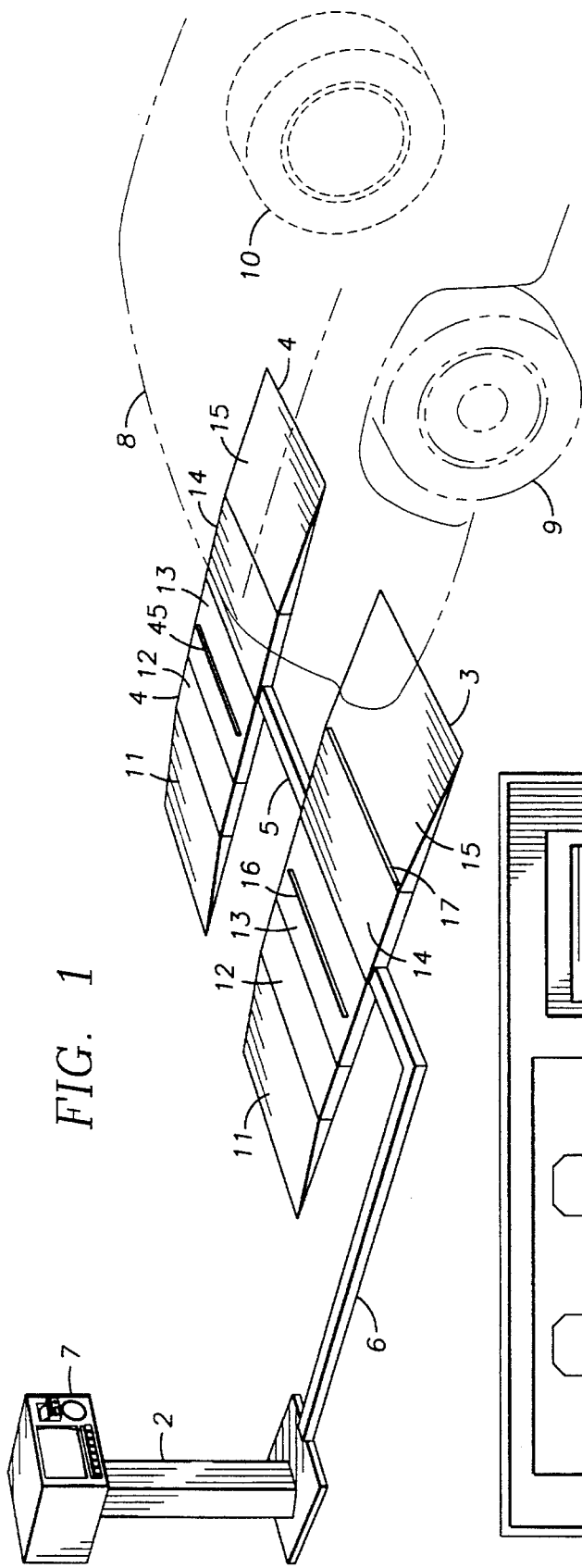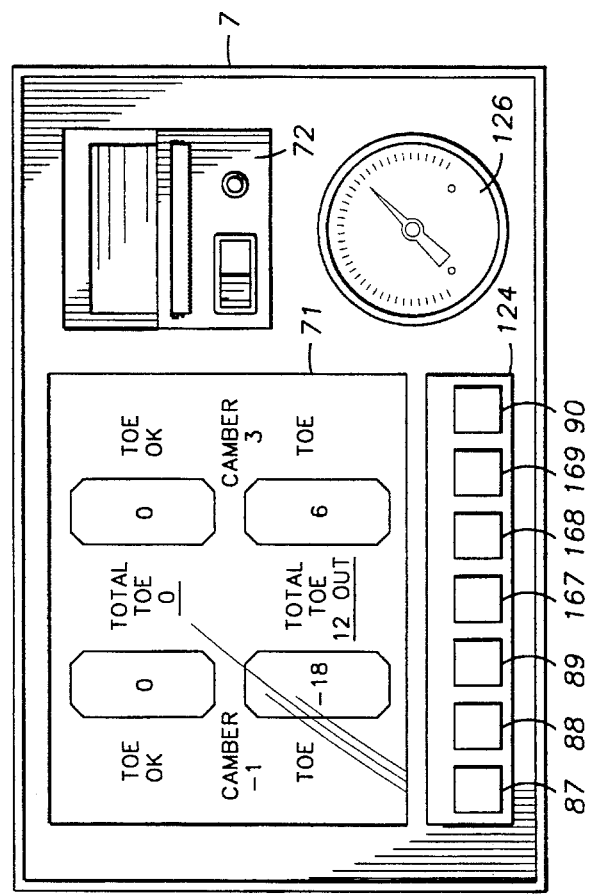

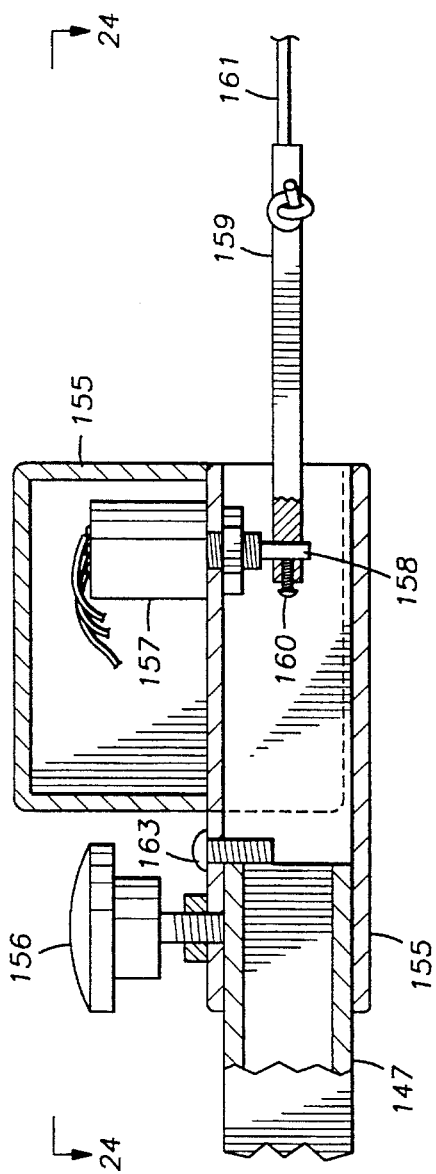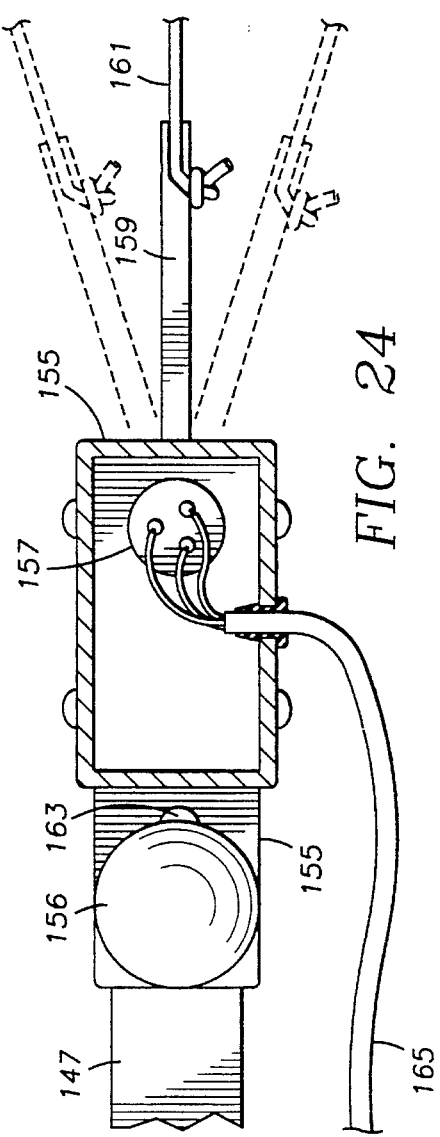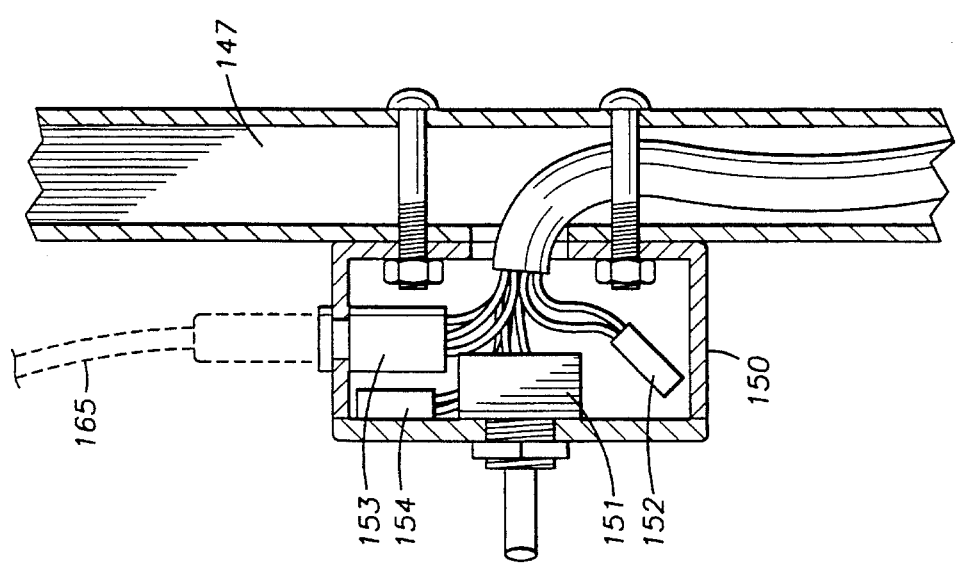

5,522,144

TIRE-WEAR DETECTOR

SUMMARY OF THE INVENTION a. Field of Invention

The present invention relates to the field of apparatus for and methods of determining the amount of side movement that each tire mounted on a vehicle will endure over a given driving distance.

More particularly, the present invention relates to apparatus for determining the amount of side movement that each tire mounted on a vehicle will endure over a given driving distance which provides electronic sensors to sense toe-in and/or toe-out, camber, straight steering, steering axis inclination (SAI), and caster, and an electronic sensor and/or gauge for tire pressure.

Yet more particularly, the present invention relates to apparatus for determining the amount of side movement that each tire mounted on a vehicle will endure over a given driving distance which provide which provides electronic sensors to sense toe-in and/or toe-out, camber, straight steering, steering axis inclination (SAI), and caster, and an electronic sensor and/or gauge for tire pressure, and which utilize a computer to calculate present state of alignment relative to a true alignment and which utilize a video display for the data output from the computer.

b. Background of the Invention

Prior art in the field of dynamic toe measurement apparatus utilized measurement of only one wheel, or utilized a mechanical linkage between the sensor blades utilized for measurement of both wheels, or utilized electrical linkage but was unable to establish repeatability by producing a reliable reset or "zero" state.

A substantial need exists for apparatus and methods of determining the amount of side movement that each tire mounted on a vehicle will endure over a given driving distance.

An additional need exists for such above-described apparatus for determining the amount of side movement that each tire mounted on a vehicle will endure over a given driving distance which provides electronic sensors to sense toe-in and/or toe-out, camber, straight steering, steering axis inclination (SAI), and caster, and an electronic sensor and/or gauge for tire pressure.

A further need exists for apparatus for determining the amount of side movement that each tire mounted on a vehicle will endure over a given driving distance which provide electronic sensors to sense toe-in and/or toe-out, camber, straight steering, steering axis inclination (SAI), and caster, and an electronic sensor and/or gauge for tire pressure, and which utilize a computer to calculate present state of alignment relative to a true alignment and which utilize a video display for the data output from the computer.

Accordingly, it is a primary object of this invention to provide apparatus and methods of determining the amount of side movement that each tire mounted on a vehicle will endure over a given driving distance.

It is another object of this invention to provide apparatus for determining the amount of side movement that each tire mounted on a vehicle will endure over a given driving distance which provides electronic sensors to sense toe-in and/or toe-out, camber, straight steering, steering axis inclination (SAI), and caster, and an electronic sensor and/or gauge for tire pressure.

It is a further and final object of this invention to provide apparatus for determining the amount of side movement that each tire mounted on a vehicle will endure over a given driving distance which provides electronic sensors to sense toe-in and/or toe-out, camber, straight steering, steering axis inclination (SAI), and caster, and an electronic sensor and/or gauge for tire pressure, and which utilizes a computer to calculate present state of alignment relative to a true alignment and which utilizes a video display for the data output from the computer.

DESCRIPTION OF THE DRAWINGS

FIG. 1 is a perspective view of the instant invention.

FIG. 7 is a frontal view of the System Control Console of the instant invention with a sample Monitor output shown.

FIG. 8c is a schematic interconnect diagram of the Right Ramp of the instant invention.

FIG. 21 is a cross-sectional view of the Camber Tool Control Mechanism of the instant invention.

FIG. 23 is a cross-sectional view of the Straight Steering Wheel Tool of the instant invention.

FIG. 24 is a cross-sectional view of the Straight Steering Wheel Tool of the instant invention taken along line 24—24 of FIG. 23.

DESCRIPTION OF THE PREFERRED EMBODIMENT

Figure 2:
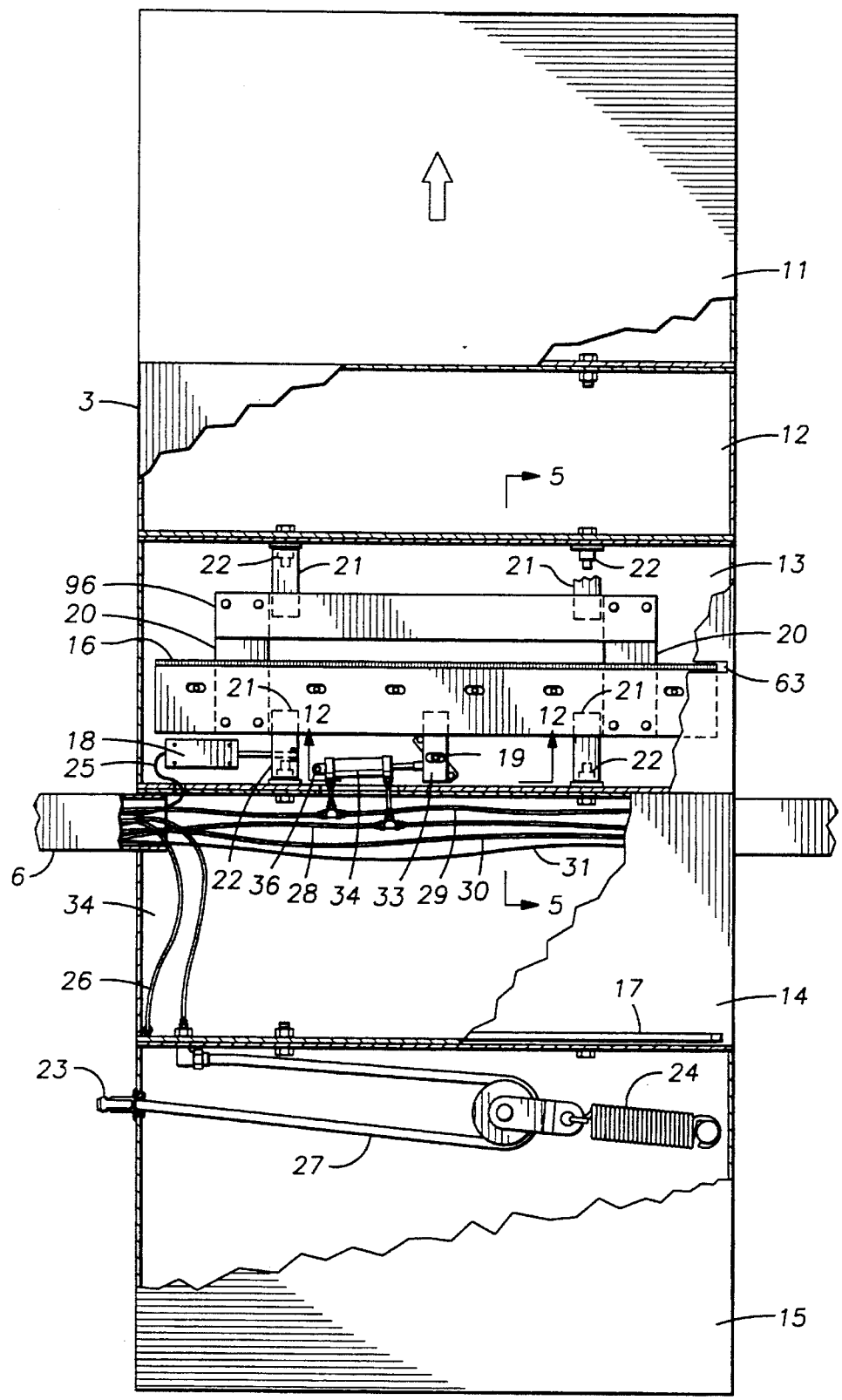
FIG. 2 is a partially cutaway top view of the left ramp of the instant invention.
Figure 3:
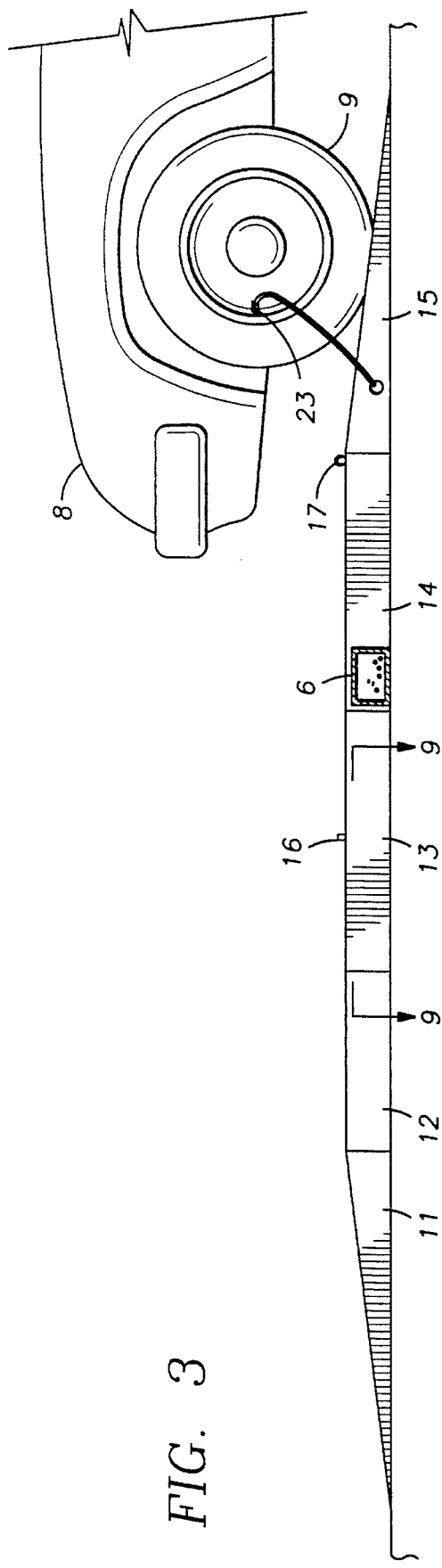
FIG. 3 is an elevational view of the left ramp of the instant invention, partially in cross-section.

As seen in FIG. 1, the Tire Wear Detection and Alignment System is a dynamic wheel alignment condition system for measuring the side movement of the wheels (9 and 10). While the output indication is of the amount of side movement for each individual wheel, accurate measurement of side movement must be made simultaneously for both wheels on an axle. Such measurement may be taken on steerable and non-steerable wheels. The measurement taken, for the left front wheel (9), is of the lateral movement of the left sensor blade (16) caused by the footprint (46), see FIG. 4, of the tire on the left front wheel (9) as it rotates over the left ramp (3). The measurement taken, for the right front wheel (10), is of the lateral movement of the sensor blade (45) caused by the footprint (47) of the tire on the right front wheel (10) as it rotates over the right ramp (4).

The Tire Wear Detection and Alignment System is comprised of a right ramp (4), a left ramp (3), a console pedestal (2) which provides a system control console (7) and color video monitor (71), an electrical and pneumatic cable ramp interconnect housing (5), and an electrical and pneumatic cable ramp to pedestal interconnect housing (6). Each ramp (3 and 4) is attached to a solid floor (1). The two ramps (3 and 4) may be moved and mounted in different positions on the solid floor (1) to additionally provide for a smaller or larger vehicle (8).

Figure 15:
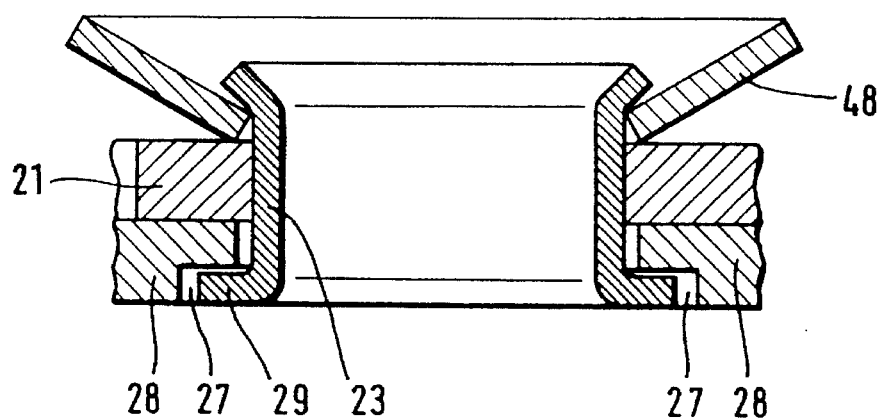
FIG. 15 is a cross-sectional view of the Steering Axis Inclination/Caster Tool of the instant invention taken across line 15—15 of FIG. 14, when said Tool is in the Steering Axis Inclination mode of operation.
Figure 16:
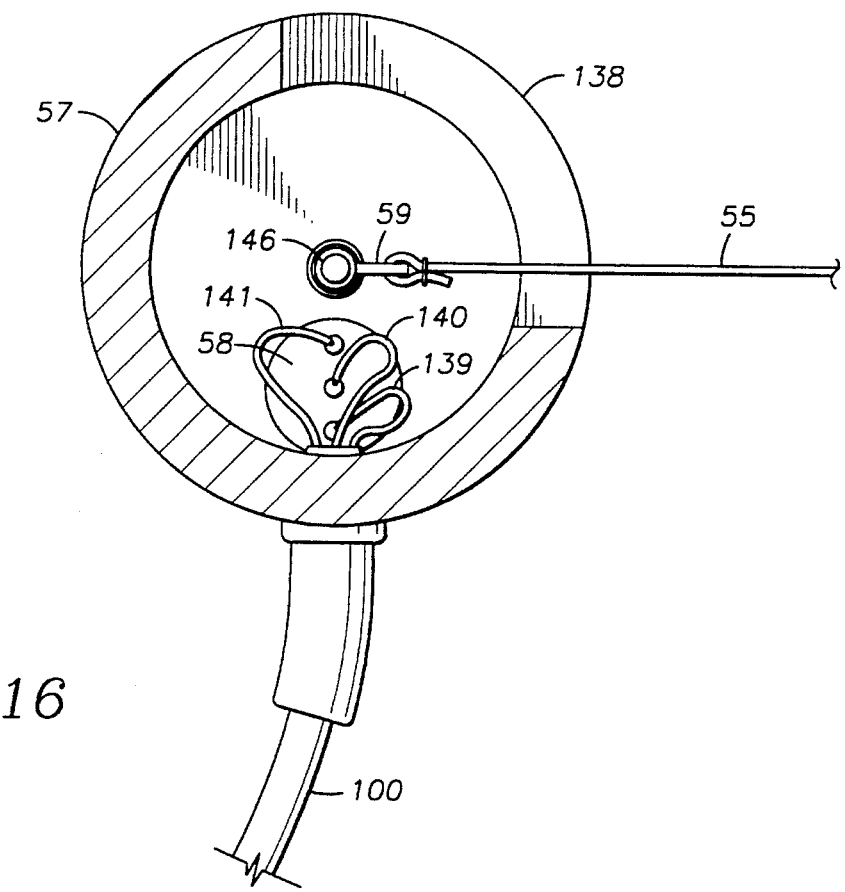
FIG. 16 is a cross-sectional view of the Steering Axis Inclination/Caster Tool of the instant invention taken across line 15—15 of FIG. 14, when said Tool is in the caster mode of operation.

The Tire Wear Detection and Alignment System may additionally provide a camber adjustment system (FIGS. 19 and 20), a straight steering adjustment system (FIG. 22), a steering axis inclination system (FIGS. 14 and 15), and a caster measurement system (FIG. 16).

The ramps (3 and 4) are electrically and pneumatically interconnected by electric cables and pneumatic hoses contained within the adjustable electrical and pneumatic cable ramp interconnect housing (5). The ramps (3 and 4) re further electrically and pneumatically connected to the console pedestal (2) and the system control console (7) by electric cables and pneumatic hoses contained within the adjustable electrical and pneumatic cable ramp to pedestal interconnect housing (6).

Each ramp (3 or 4) is comprised of an approach section (15), a vehicle suspension settling section (14), a sensor section (13), a footprint section (12), and a departure section (11). Each section of a ramp (3 or 4) is mechanically connected to the adjacent section(s) of that same ramp such that the sections form a single, continuous ramp surface for a tire to travel over.

The approach ramp section (15) is constructed in a wedge shape with hollow interior to house, as seen in FIG. 2 in the case of the approach ramp section (15) of the left ramp (3), a left tire inflator hose (27) and an air hose return spring (24) which is mechanically connected to the interior surface of the approach ramp section (15). The approach ramp section (15) of the right ramp (4) is constructed similarly with a right tire inflator hose (30) and an air hose return spring (24).

The vehicle suspension settling section (14) is constructed as a hollow rectangular solid to house and provide throughput for the electrical cables and pneumatic hoses connecting the various sensors, reset mechanisms, and tire inflators contained in the ramps (3 and 4) of the invention to the computer and electrical and electronic controls contained in the system control console (7). Attached to the upper surface of the vehicle suspension settling section (14) of the left ramp (3) is a flexible pneumatic trip hose (17) which, when a vehicle (8) is rolled over it, serves the function of triggering the initialization of the Tire Wear Detection and Alignment System.

The vehicle suspension settling section (14) of the right ramp (4) and of the left ramp (3) each provides mechanical connection to an end of the adjustable electrical and pneumatic cable ramp interconnect housing (5). The vehicle suspension settling section (14) of the left ramp (3) provides mechanical connection to one end of the adjustable electrical and pneumatic cable ramp to pedestal interconnect housing (6).

The sensor section (13) is constructed as a hollow rectangular solid to house the sensor blade mechanism (96), the reset mechanism (19), and the linear analog sensor device (18).

Figure 12:
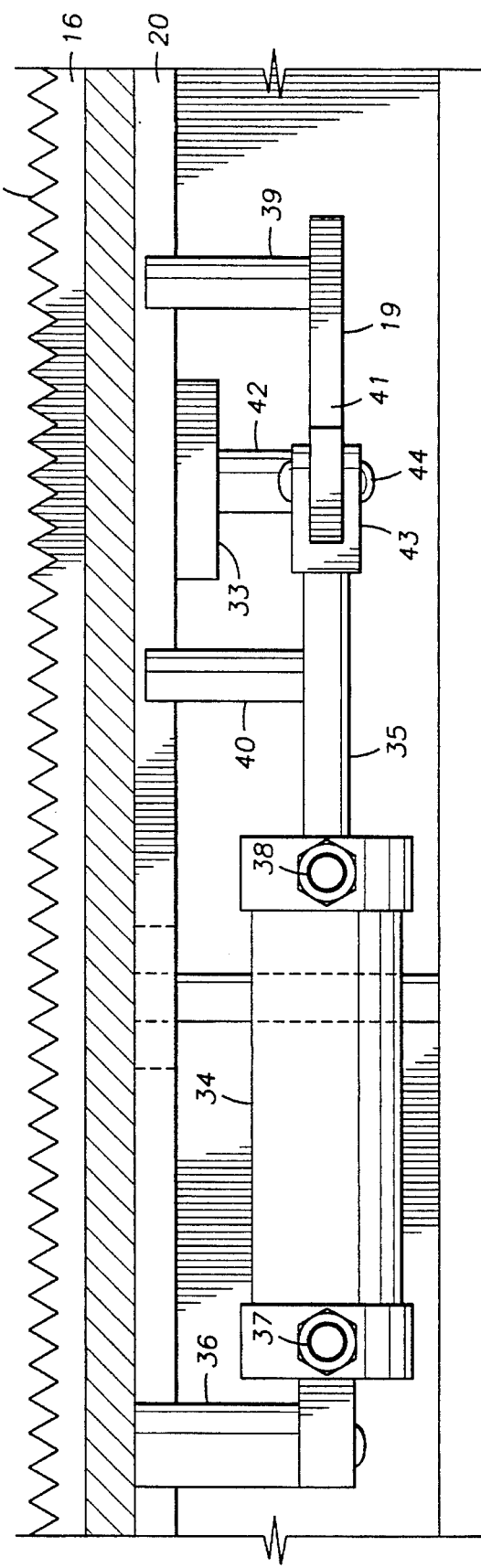
FIG. 12 is a cross-sectional view of the Left Ramp of the invention taken along line 12—12 of FIG. 2 showing the Reset Mechanism.
Figure 5:
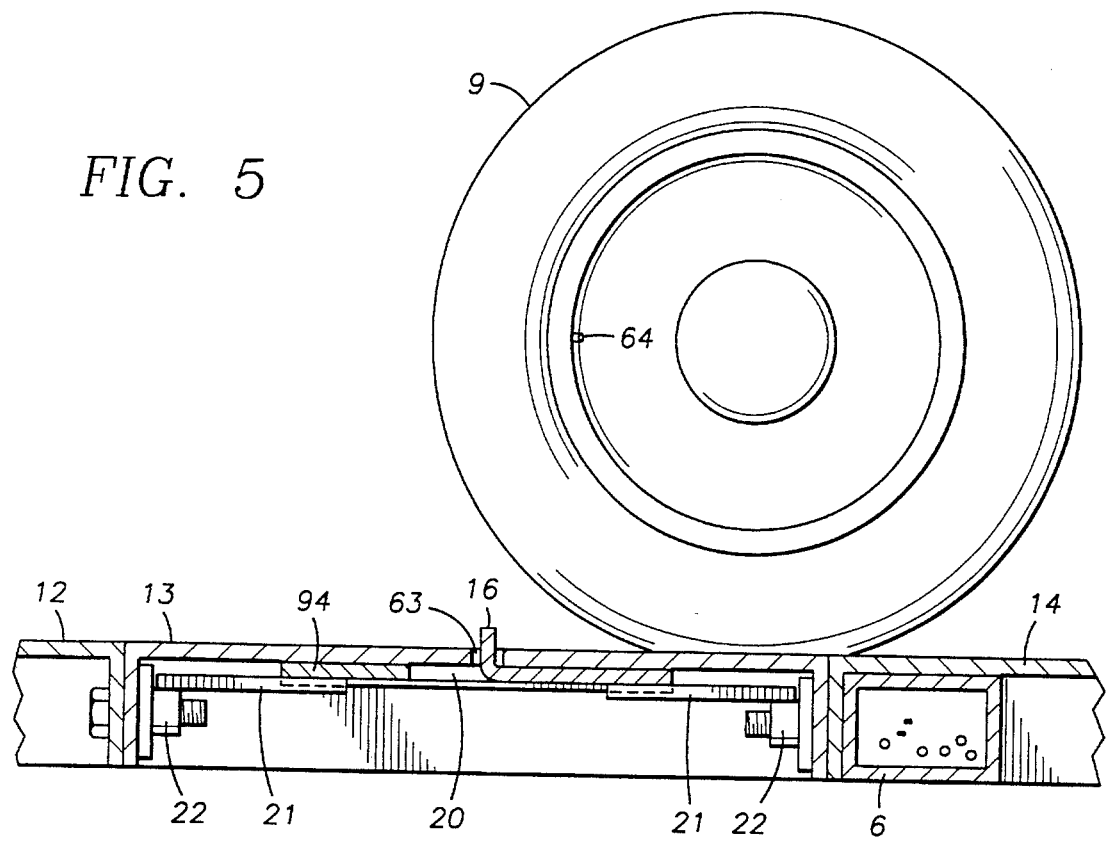
FIG. 5 is a cross-sectional view taken along line 5—5 of FIG. 2 showing the Sensor Plate Assembly of the instant invention.
Figure 6:
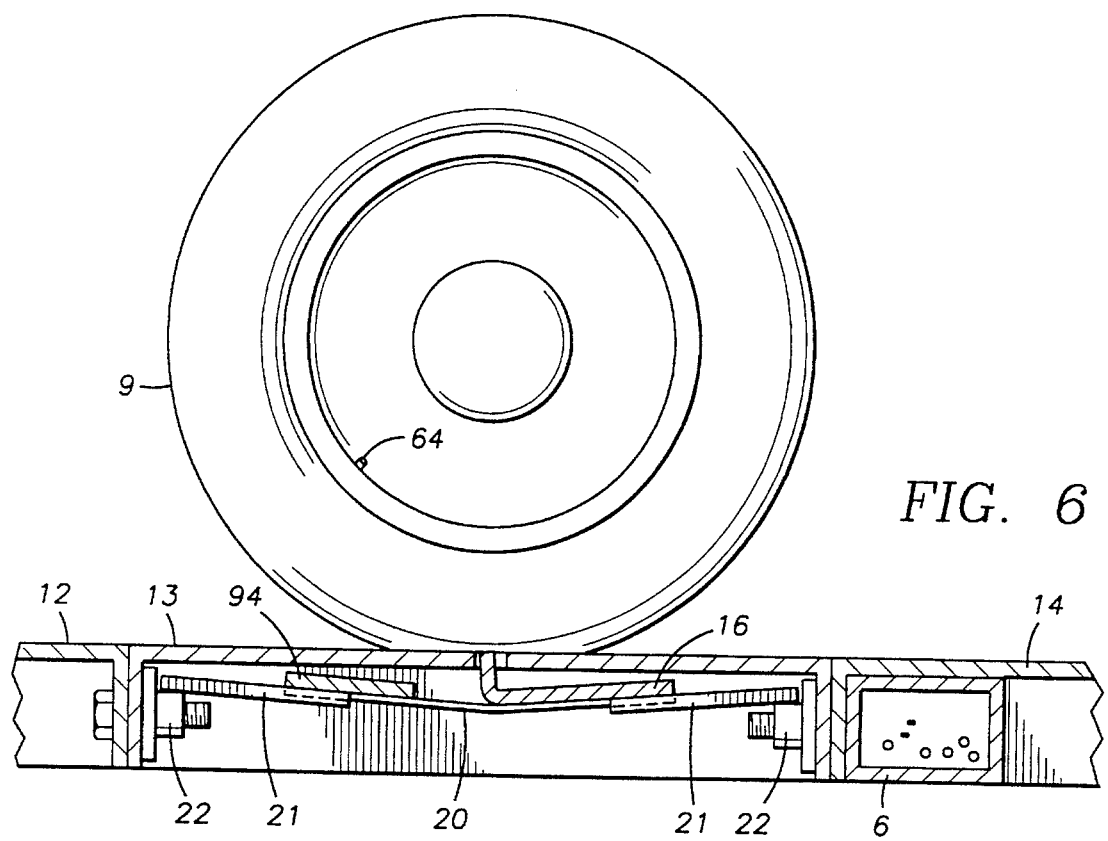
FIG. 6 is a cross-sectional view taken along line 5—5 of FIG. 2 showing the Sensor Plate Assembly of the instant invention in measurement mode.

The sensor blade mechanism (96), best seen in comparison between FIG. 2, FIG. 5 and FIG. 6, comprises an "L" shaped sensor blade (16 or 45) which provides serrated teeth (69), see FIG. 12, a sensor blade spring plate (20), a sensor blade reinforcement plate (94), sensor blade rollers (22), and sensor blade roller tabs (21). The sensor blade (16 or 45) extends vertically through a sensor blade slot (63) in the sensor section (13) of the ramp (3 or 4) until forced downwardly by the weight of a wheel (9 or 10), shown in FIGS. 2, 5 and 6 as the left front wheel (9), rolling over it. In operation, see FIG. 5, friction between the sensor blade reinforcement plate (94) and the inside of the housing of the sensor section (13) and between the sensor blade (16) and the inside of the housing of the sensor section (13) hold the sensor blade (16) in position laterally until the sensor blade (16) is depressed, see FIG. 6, by the weight of the left front wheel (9) rolling over it. The depression of the sensor blade (16) is made possible by the flexibility of the sensor blade spring plate (20) which provides vertical support to the sensor blade (16). When the sensor blade (16) is depressed by the weight of the left front wheel (9) rolling over it, the friction between the sensor blade reinforcement plate (94) and the inside of the housing of the sensor section (13) and between the sensor blade (16) and the inside of the housing of the sensor section (13) is released, FIG. 6, and the entire sensor blade mechanism (96) is supported by the sensor blade roller tabs (21) resting on the roller bearings of the sensor blade rollers (22). The sensor blade roller tabs (21) are mechanically attached to the sensor blade (16) and to the sensor blade reinforcement plate (94). The sensor blade rollers (22) are mechanically attached to the interior of the sensor section (13) housing. The sensor blade spring plate (20) is mechanically attached to the sensor blade reinforcement plate (94) and is connected to the sensor blade (16) by sensor blade centering pins (68) which extend vertically through sensor blade centering slots (67) in the sensor blade (16).

Figure 9:
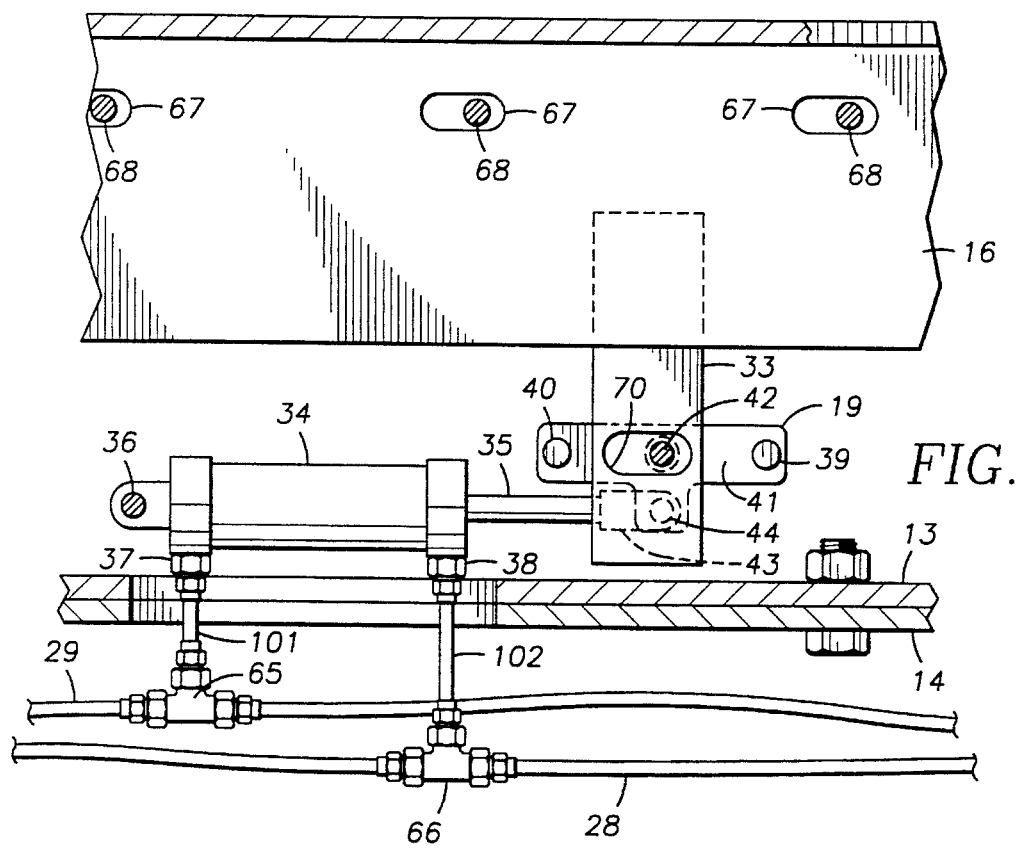
FIG. 9 is a cross-sectional view of the Left Ramp of the instant invention taken along line 9—9 in FIG. 3 showing the Reset Mechanism of the instant invention in read mode.
Figure 10:
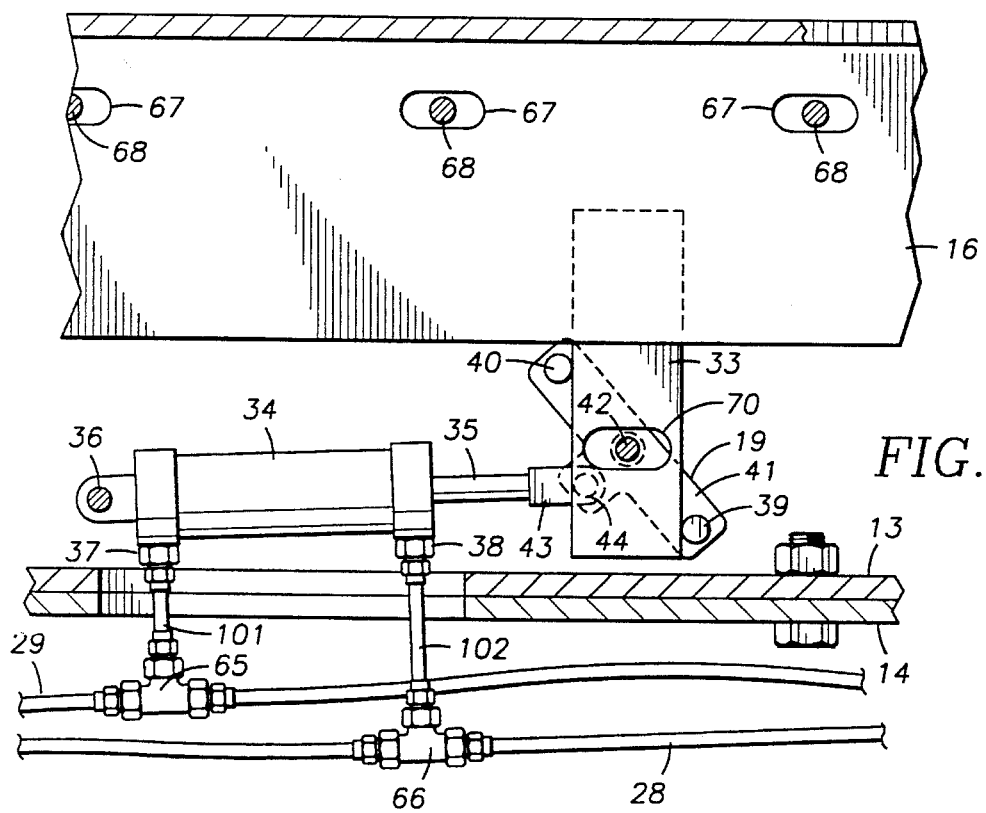
FIG. 10 is a cross-sectional view of the Left Ramp of the instant invention taken along line 9—9 in FIG. 3 showing the Reset Mechanism of the instant invention in reset mode.
Figure 11:
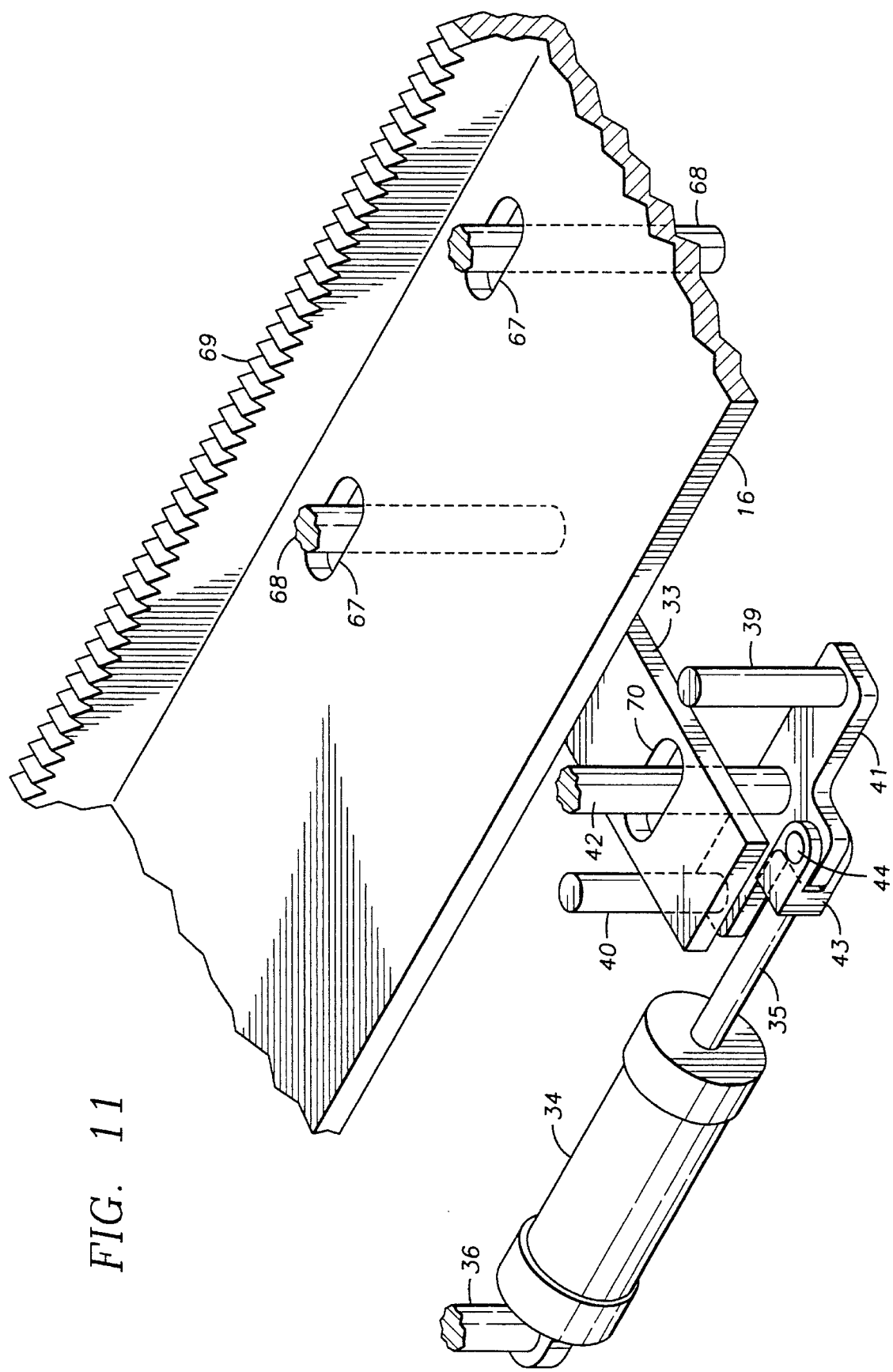
FIG. 11 is a perspective view, partially in cross-section, of the Left Ramp of the instant invention showing the Reset Mechanism of the instant invention in read mode, with the top plate of the ramp removed for clarity.

The reset mechanism (19), best seen in FIG. 9, FIG. 10, FIG. 11, and FIG. 12, comprises a rectangular reset tab (33) which is mechanically connected to the sensor blade (16), an air cylinder (34), a base plate of the swivel mechanism (41), a right vertical arm of the swivel mechanism (39), a left vertical arm of the swivel mechanism (40), a swivel mechanism stabilizer pin (42), a clevis housing (43), and a clevis pin (44). The pneumatic inputs to the air cylinder (34) are taken for the reset mode operation from the pneumatic hose (28), through the pneumatic tee connector (66), through the pneumatic hose (102), and into the pneumatic signal input port (38) of the air cylinder (34). The pneumatic inputs to the air cylinder (34) are taken for the measurement mode operation from the pneumatic hose (29), through the pneumatic tee connector (65), through the pneumatic hose (101), and into the pneumatic signal input port (37) of the air cylinder (34). The air cylinder (34) has an air cylinder shaft (35) and is mechanically connected to the interior of the ramp sensor section (13) housing by an air cylinder support (36). The air cylinder shaft (35) is mechanically connected to the clevis housing (43), and the clevis pin (44) is mechanically connected to the base plate of the swivel mechanism (41). The base plate of the swivel mechanism (41) has mechanically attached to it and extending vertically from its upper surface a swivel mechanism stabilizer pin (42), a right vertical arm of the swivel mechanism (39), and a left vertical arm of the swivel mechanism (40). The swivel mechanism stabilizer pin (42) extends vertically through a reset mechanism centering slot (70) in the sensor blade tab (33), while the right vertical arm of the swivel mechanism (39) extends vertically above the right side of the sensor blade tab (33), and the left vertical arm of the swivel mechanism (40) extends vertically above the left side of the sensor blade tab (33). This arrangement of components provides for the centering of the sensor blade tab (33), and thus the reset of the sensor blade (16) position, upon retraction of the air cylinder shaft (35) as seen in FIG. 10. In the measurement mode, the air cylinder shaft (35) is extended, as shown in FIG. 9, which in turn causes the extension of the right vertical arm of the swivel mechanism (39) and the left vertical arm of the swivel mechanism (40) away from the sides of the sensor blade tab (33). In the measurement mode the sensor blade (16) is permitted free lateral travel by vertical extension of the swivel mechanism stabilizer pin (42) through the reset mechanism centering slot (70) within the sensor blade tab (33).

Figures 13, 13A:
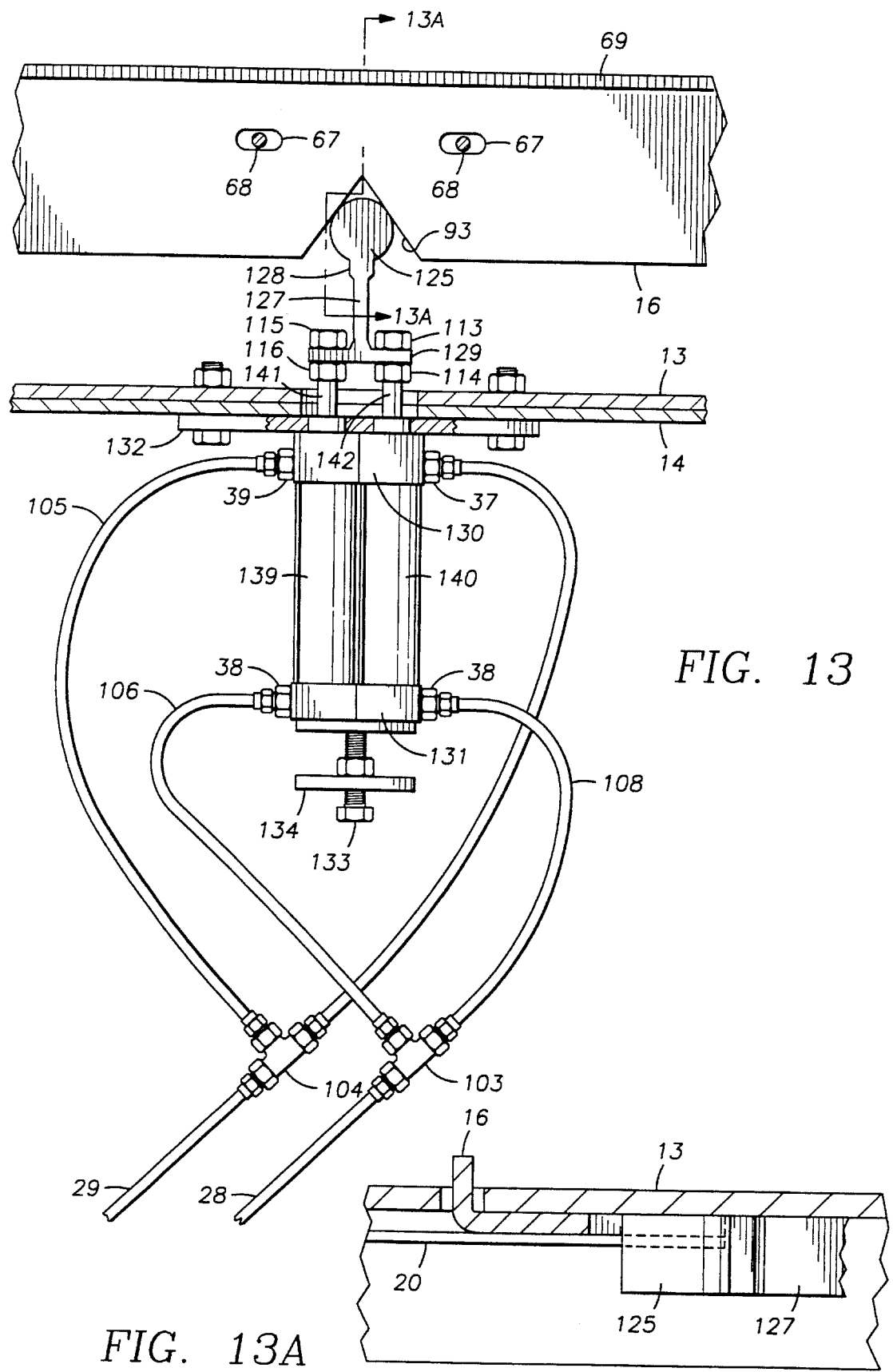
FIG. 13 is a cross-sectional view of the Left Ramp of the instant invention similar to FIG. 9, but showing an alternate preferred embodiment of the reset mechanism of the instant invention in reset mode.
FIG. 13a is a cross-sectional view through line 13a—13a of FIG. 13.
Figure 14:
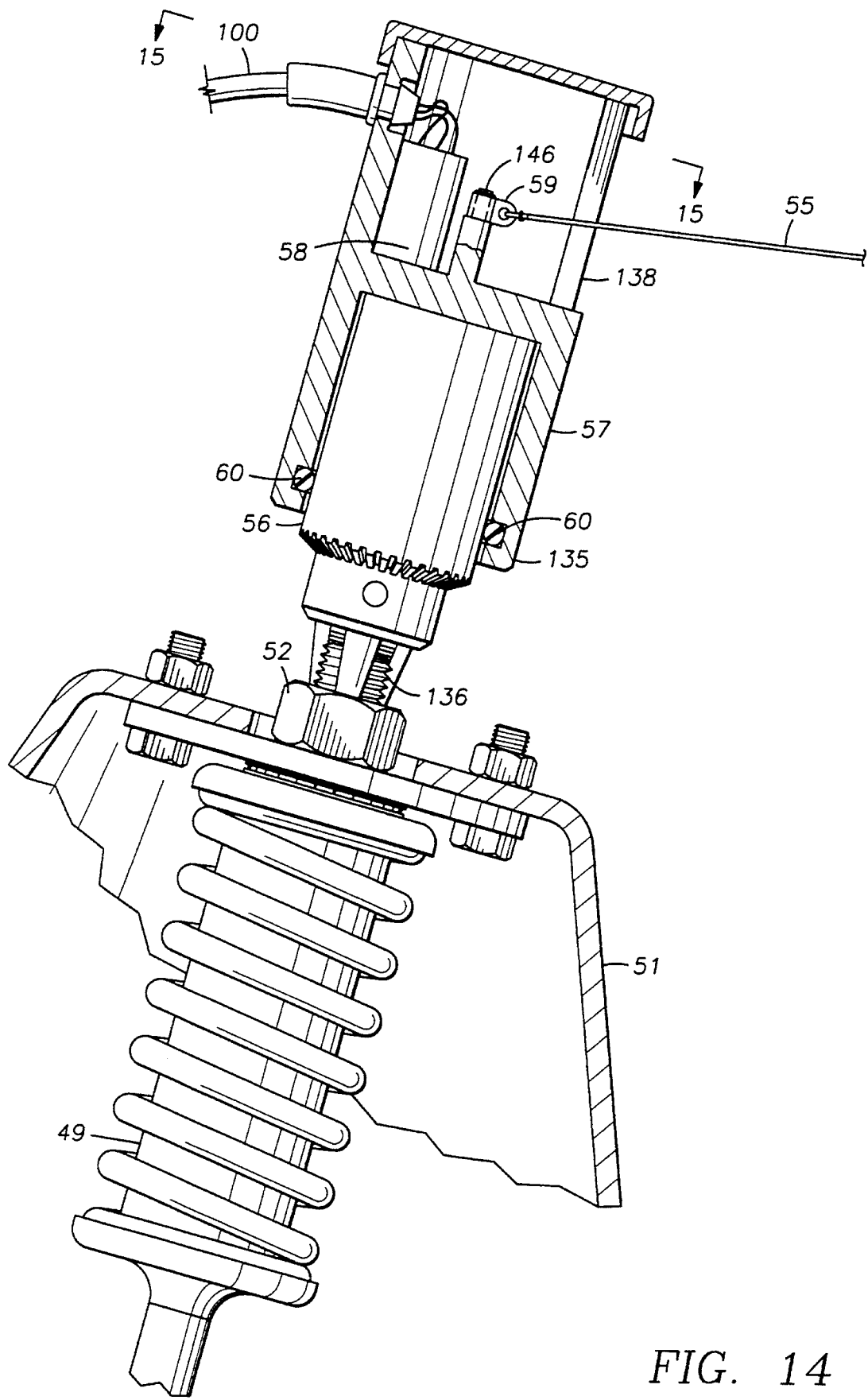
Figure 15:
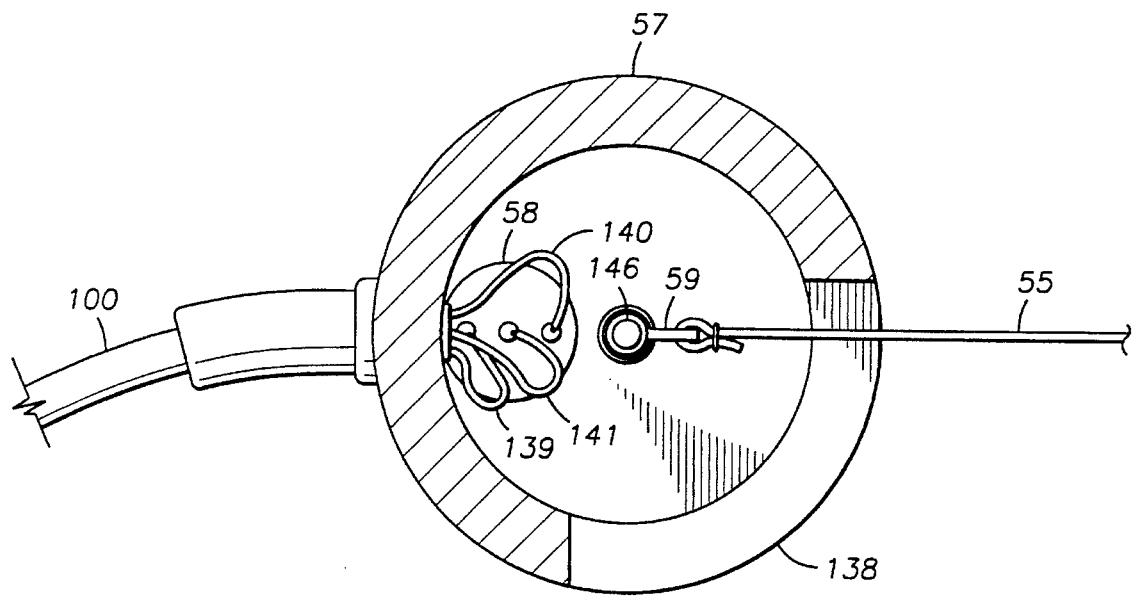

An alternative reset mechanism, seen in FIG. 13 and FIG. 13A, comprises a "V" cut (93) in the sensor blade (16), two air cylinders (139 and 140), and a ram (128). Each air cylinder (139 and 140) is mechanically connected to the other by an upper housing (130) and a lower housing (131). The upper housing (130) provides apertures for the air cylinders shafts (141 and 142), pneumatic signal ports (37) for measurement mode signals and provides an air cylinder support plate (132) which is mechanically connected to the housings of the vehicle suspension settling section (14) and sensor section (13) of the ramp (3 or 4). Two air cylinders (139 and 140) are utilized to prevent the ram (128) from rotating. The lower housing (131) provides pneumatic signal ports (38) for reset mode signals and a bolt (133) with threaded locking mechanism (134) which connects the upper housing (130) to the lower housing (131). Each air cylinder (139 and 140) has an air cylinder shaft (141 and 142, respectively) and both air cylinder shafts (141 and 142) are mechanically connected to the ram (128) at its ram fastener end (129) by mounting and adjustment nuts (113, 114, 115, and 116). The pneumatic inputs to the air cylinders (139 and 140) are taken for the reset mode operation from the pneumatic hose (28), through the pneumatic tee connector (103), through the pneumatic hoses (106 and 108), and into the pneumatic signal input ports (38) of the air cylinders (139 and 140). The pneumatic inputs to the air cylinders (139 and 140) are taken for the measurement mode operation from the pneumatic hose (29), through the pneumatic tee connector (104), through the pneumatic hoses (105 and 107), and into the pneumatic signal input ports (37) of the air cylinders (139 and 140). The ram (128) comprises a solid cylindrical head piece (125) connected along its circumference to a ram shaft (127) which in turn is connected on its opposite end to the ram fastener end (129). When the ram (128) is forced outwardly, away from the air cylinders (139 and 140), the ram (128) forces itself into the "V" cut (93) in the sensor blade (16) thus causing the sensor blade (16) to center itself about the center line of the ram shaft (127). In the measurement mode, the air cylinder shafts (141 and 142) are retracted, retracting the ram (128) from the "V" cut (93) in the sensor blade (16) thereby allowing the sensor blade (16) free lateral travel, limited only by the travel of the sensor blade centering pins (68) in the sensor blade centering slots (67).

Figure 17:
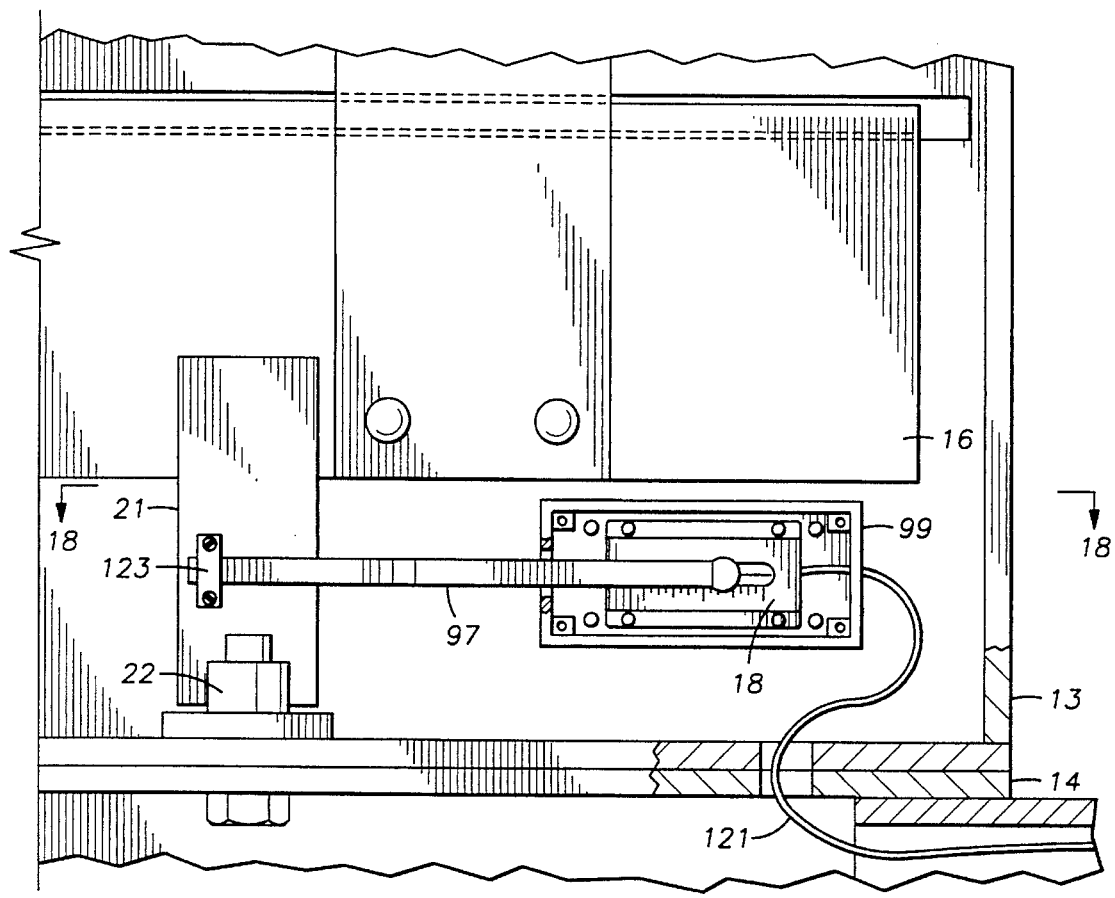
FIG. 17 is a bottom view of the Linear Sensor Mechanism of the instant invention.
Figure 18:
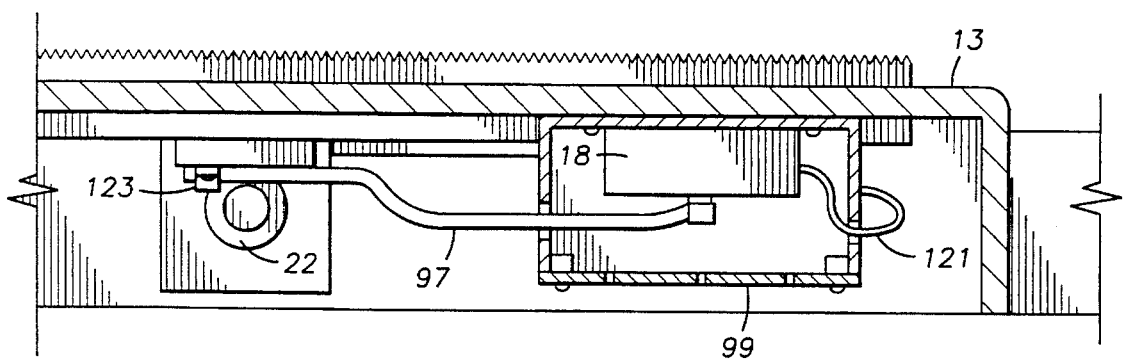
FIG. 18 is a cross-sectional view of the Linear Sensor Mechanism of the instant invention taken across line 18—18 of FIG. 17.

The linear analog sensor device (18), best seen in FIG. 17 and FIG. 18, comprises a commonly available linear mechanical motion to voltage converter, contained in a housing (99) which is mechanically attached to the interior of the sensor section (13) housing, and a sensor arm (97)

which is mechanically attached by retainer (123) to a sensor blade roller tab (21). The sensor arm (97) is made of a flexible strip of material such that it is flexible vertically, but not laterally nor longitudinally. The retainer (123), when loosened, allows the adjustment of the sensor arm (97). The linear analog sensor device (18) has an electrical output through the electrical signal cable (121) which is proportional to the lateral, linear travel of the sensor blade roller tab (21) and thus to the lateral, linear travel of the sensor blade mechanism (96). The housing (99) of the linear analog sensor device (18) provides weep holes in its bottom for condensate escape.

The footprint section (12) of the ramp (3 or 4) is constructed as rectangular solid and houses no additional elements. Likewise, the departure section (11) is constructed in a wedge shape and houses no additional elements.

Figure 8A:
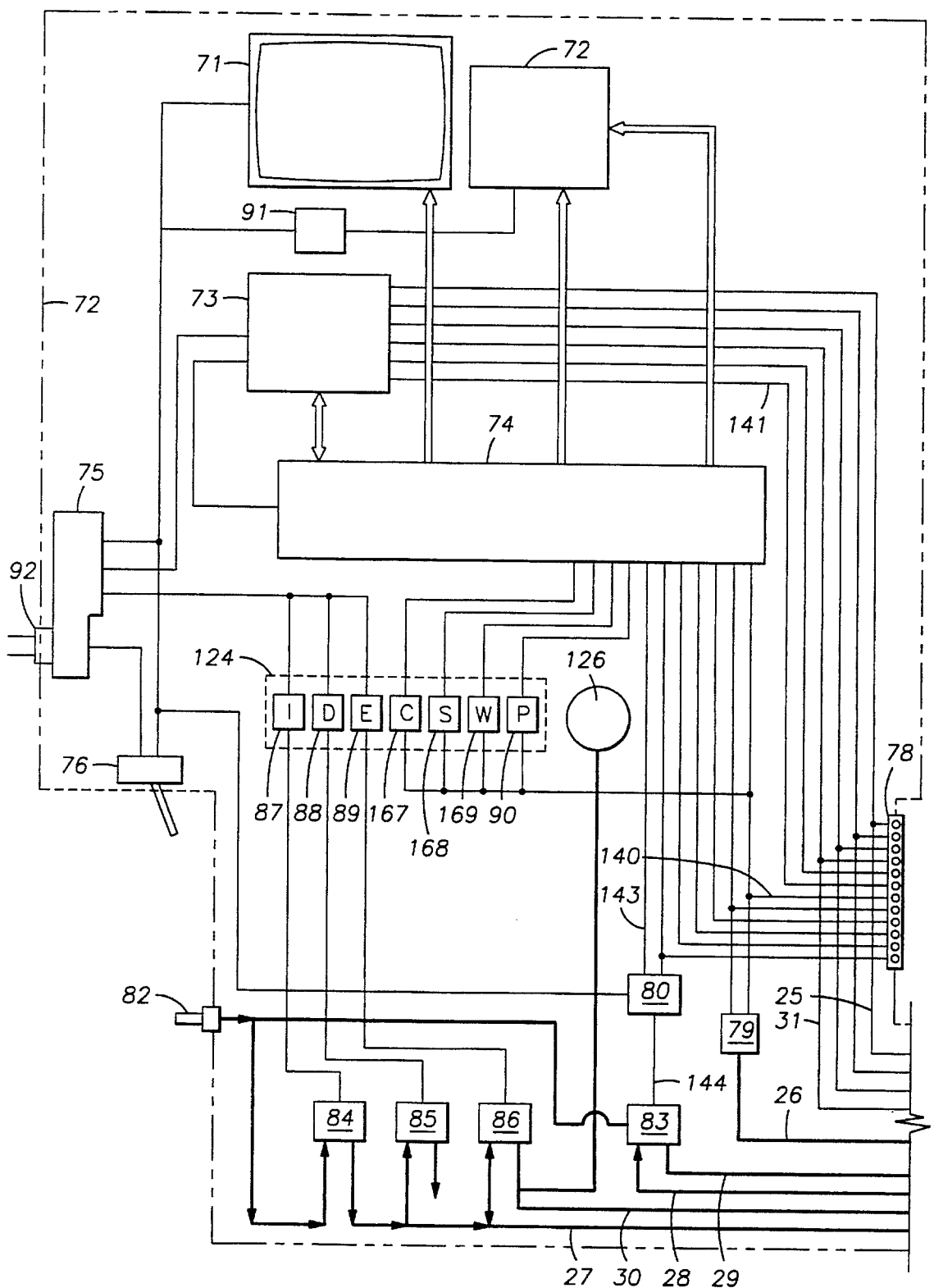
FIG. 8a is a schematic interconnect diagram of the System Control Console of the instant invention.
Figure 8B:
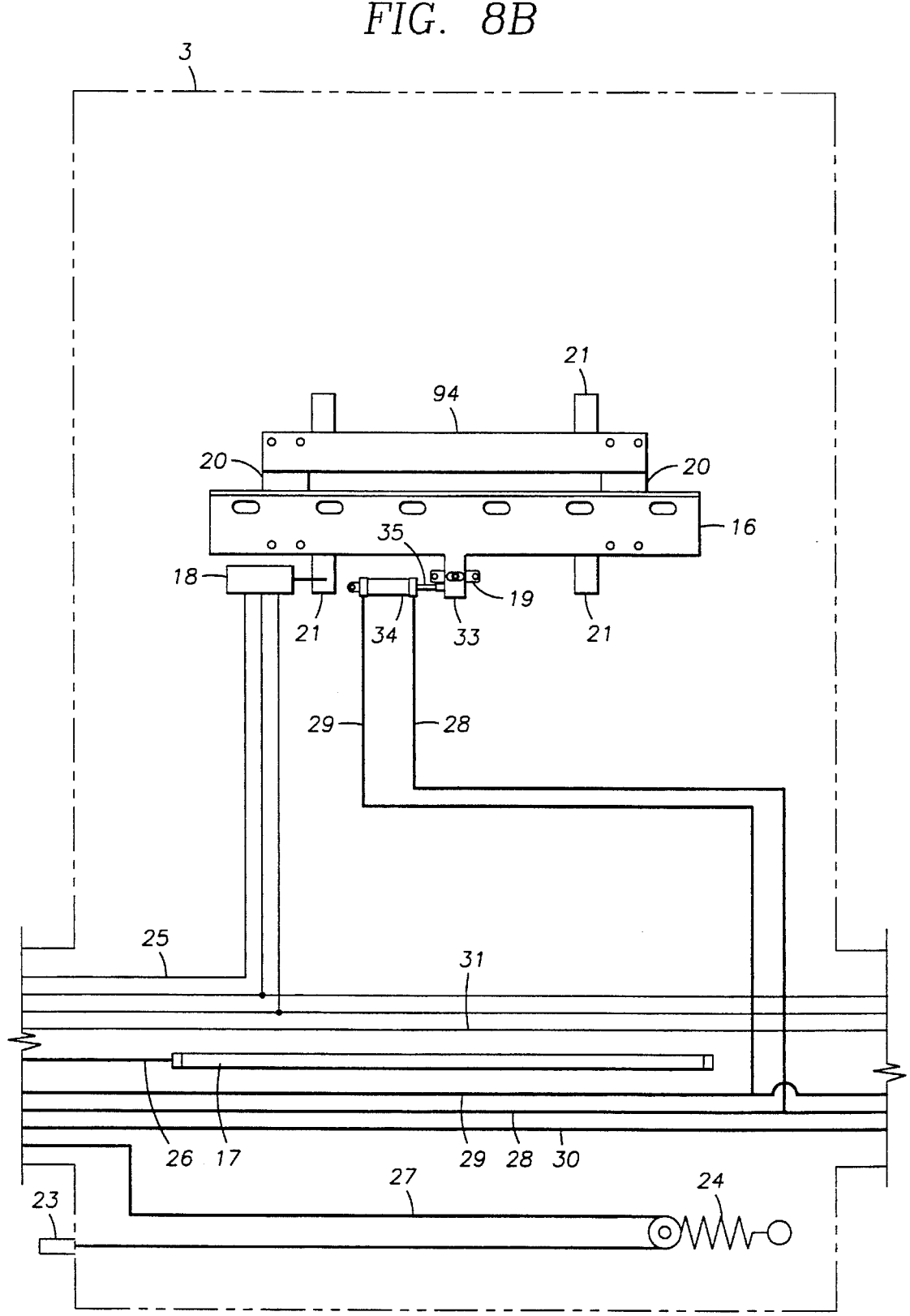
FIG. 8b is a schematic interconnect diagram of the Left Ramp of the instant invention.

The console pedestal (2) supports the system control console (7) which provides, as best seen in FIG. 8A, a power supply (75), a computer (74), an analog to digital interface with EPROM electronics (73), a color video monitor (71), a printer (72), as printer power supply (91), a tire air pressure gauge (126), a push button control panel (124), an on-off switch (76), a supply air input quick connect (82), an opto-isolated solid state relay (80), an air crossover valve (83), a tire inflator solenoid air valve (84), a tire deflater solenoid air valve (85), a tire air pressure equalizer solenoid air valve (86), and an external access port (78) for accessories and test tools.

Figure 28:
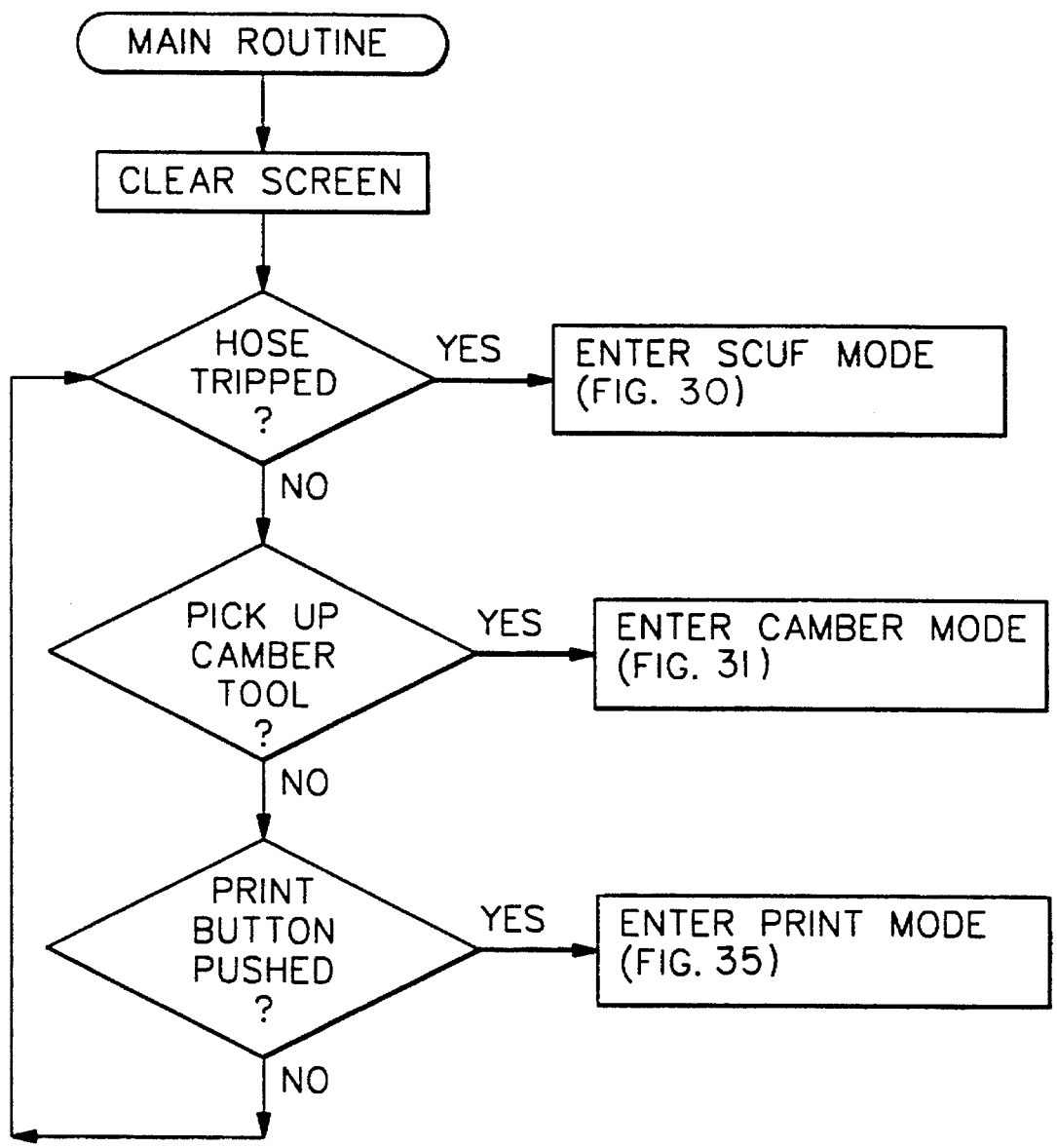
FIG. 28 is a flow diagram of the operation of the main routine of the instant invention.

In operation, see FIG. 8A, the external AC power is connected to the power supply input plug (92) and the external air supply is connected to the supply air input quick connect (82), then once the on-off switch (76) is thrown the Tire Wear Detection and Alignment System is turned on. At the time that the Tire Wear Detection and Alignment System is turned on, it enters into its main routine (FIG. 28). The Eprom in the analog to digital interface with EPROM electronics (73) is programmed to, at power initiation, cause the computer (74) to send, on an electrical conductor (143), a reset pulse to the optoisolated solid state relay (80) which activates, through an electrical conductor (144), the air crossover valve (83), which then supplies air pressure on the pneumatic hose (28) causing the air cylinders (34 and 144) to activate, resetting the left sensor blade (16) and the right sensor blade (45). The mechanical reset of the sensor blades (16 and 45) ends when the computer (74) determines that a reset has occurred. The computer (74) monitors the outputs of the linear analog sensor device (18) in the left ramp (3) and of the linear analog sensor device (145) in the right ramp (4) and determines when the outputs have settled, the outputs at that point are taken by the computer (74) to be the reset or "zero" values. The electrical output of the linear analog sensor device (18) in the left ramp (3) is connected by the left linear sensor electrical signal cable (25) to the analog to digital interface with EPROM electronics (73) and the electrical output of the linear analog sensor device (18) in the right ramp (4) is connected by the right linear sensor electrical signal cable (31) to the analog to digital interface with EPROM electronics (73) where such electrical outputs are converted to digital values which are provided by the analog to digital interface with EPROM electronics (73) to the computer (74). Once the computer (74) determines that a mechanical reset or "zero" value has been achieved, the computer then sends a signal to the optoisolated solid state relay (80) which energizes the air crossover valve (83). The air crossover valve (83) then provides a pneumatic output to the pneumatic hose (29) which activates the air cylinder (34) extending the air cylinder shaft (35), as seen in FIG. 9, and thus releases the sensor blade (16) for measurement mode operation. Likewise, as seen in FIG. 8C, the pneumatic hose (29) connects to the right ramp (4) and a release of sensor blade (45) is caused by a pneumatic output from the air crossover valve (83).

At the time of power initiation, after the mechanical values are in range, ie. "zero", the computer (74) will read the signals from the left and right linear analog sensor devices (18 and 145) and store them as a number, representing the first or initial value, the "0" state. The Eprom in the analog to digital interface with EPROM electronics (73) is also programmed to, at power initiation, cause the computer (74) to clear or blank the color video monitor (71).

Figure 30:
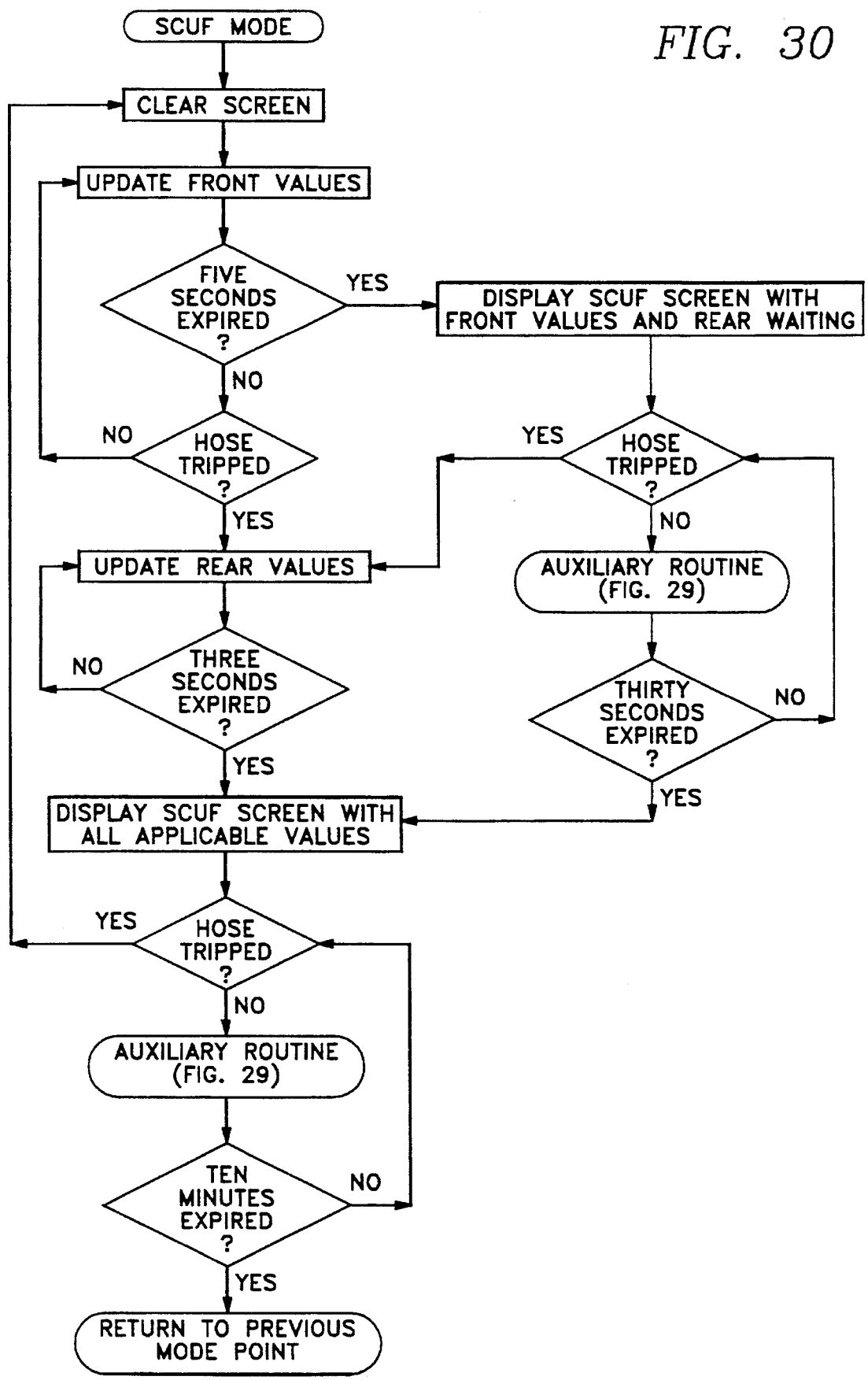
FIG. 30 is a flow diagram for the scuff mode of the instant invention.

Following power initiation, once the trip mechanism air hose (26) generates a pneumatic impulse, as from a vehicle (8) crossing over it, the Tire Wear Detection and Alignment System enters the scuff mode (FIG. 30). If no pneumatic impulse is generated by the trip mechanism air hose (26) within ten minutes, the Tire Wear Detection and Alignment System will return to the main routine, see FIGS. 28 and 30, and resets itself mechanically and electronically. Logically, the loop in FIG. 28, the main routine, is interrupted when a vehicle's (8) left front wheel (9) rolls over the trip mechanism air hose (26). The computer (74) then reads the signals from the left and right linear analog sensor devices (18 and 145) and stores the values as a second, or measurement mode, value. The computer (74) then compares the first and second values that it stored from reading the left and right linear analog sensor devices (18 and 145) and calculates the difference and displays the difference value on the color video monitor (71) in numbers of feet per mile and in color; as follows:

Green wheel=0 to 7 feet per mile

Orange wheel=8 to 11 feet per mile

Red wheel=12 feet per mile and above

The second value stored by the computer (74) from reading the left and right linear analog sensor devices (18 and 145) after the left front wheel (9) and the right front wheel (10) are rolled over the sensor blades (16 and 45) is retained by the computer (74) as an initial or "0" value for the purposes of calculating the difference between such initial or "0" value and a third value stored by the computer (74) from reading the left and right linear analog sensor devices (18 and 145) after the wheels on the rear axle of the vehicle (8) are rolled over the sensor blades (16 and 45) and of displaying the difference value on the color video monitor (71) in numbers of feet per mile and in color, as above-indicated for the front axle.

Figure 29:
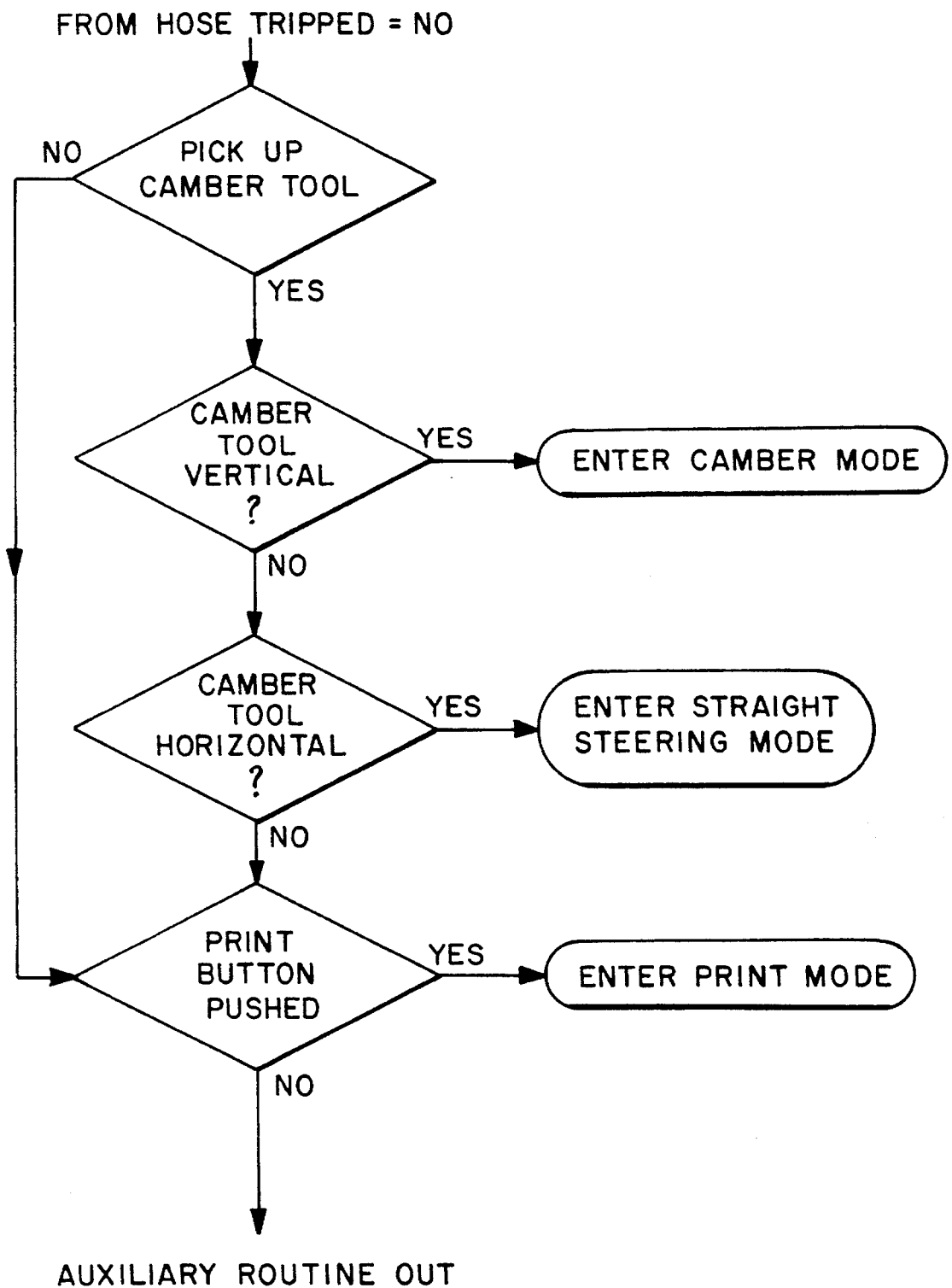
FIG. 29 is a flow diagram of the operation of the auxiliary routine of the instant invention.

As seen in FIG. 29a, three seconds after the above-mentioned third value was stored by the computer (74) and utilized by the computer (74) to calculate and display the difference value for the rear wheels of the vehicle (8), the computer (74) signals the opto-isolated solid state relay (80) to close and the above-described resetting of the left sensor blade (16) and the right sensor blade (45) takes place. The difference values calculated by the computer (74) stay on the color video monitor (71) until a period of ten minutes has expired, see FIG. 30. Following such ten minute period, the Tire Wear Detection and Alignment System will return to the main routine, see FIGS. 28 and 30.

Prior to initiation of scuff mode operation, see FIG. 30, by rolling the vehicle (8) over the flexible pneumatic trip hose (17), the vehicle (8) is stopped on the vehicle suspension settling section (14) of the left (3) and right (4) ramps in order to establish manufacturer's specified air pressures in the vehicle (8) tires. To establish manufacturer's specified air pressures in the vehicle (8) tires, without depressing any of the inflate button (87), the deflate button (88), or the equalize button (89), whereby the inflate solenoid (84), the deflate solenoid (85), and the tire pressure equalizer solenoid (86) are all de-energized, the tire air chuck (23) from the left ramp (3) is connected to the tire on the left front wheel (9) and the tire air chuck (23) from the right ramp (4) is connected to the tire on the right front wheel (10). The tire air pressure gauge (126) then indicates the air pressure in the tire on the right front wheel (10) through pneumatic line (30) which connects to the tire air chuck (23) in the right ramp (4). The tire pressure equalizer button (89) on the push button control panel (124) is then depressed thereby activating the tire air pressure equalizer solenoid air valve (86) which permits free flow of air between pneumatic hose (30) to the tire air chuck (23) on the right ramp (4) and pneumatic hose (27) to the tire air chuck (23) on the left ramp (3). At this point the two front tires are in effect connected together through the pneumatic hoses (27 and 30), and therefore equalized in pressure. Thereafter, the operator, while continuing to depress the tire pressure equalizer button (89), pushes either the tire inflator button (87) which activates the tire inflator solenoid air valve (84) or the tire deflater button (88) which activates the tire deflater solenoid air valve (85), as necessary to set tire pressure to manufacturer's specification. The tire inflator solenoid air valve (84), when activated, acts to permit additional air from the supply air input quick connect (82) into the loop formed by pneumatic hose (27), the tire on the left front wheel (9), pneumatic hose (30), the tire on the right front wheel (10), and the activated tire air pressure equalizer solenoid air valve (86). The tire deflater solenoid air valve (85) acts to vent air from that same loop into the atmosphere.

Figure 35:
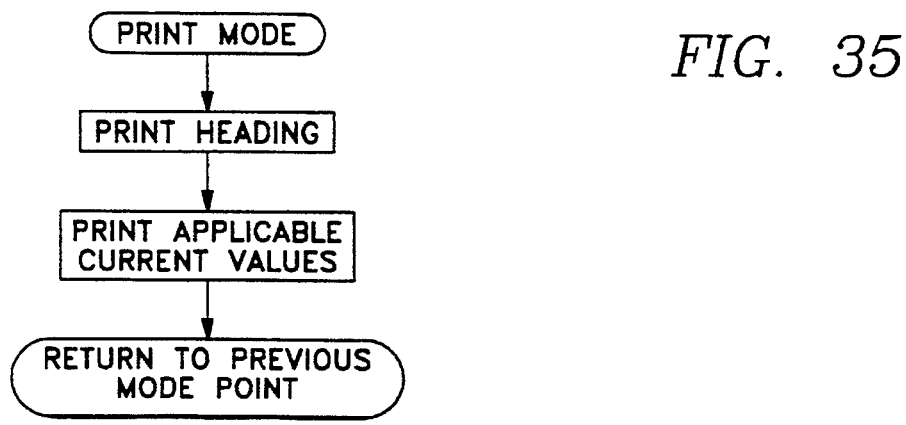
FIG. 35 is a flow diagram of the operation of the print mode of the instant invention.

After the tire pressures are equalized and the computer (74) has placed the Tire Wear Detection and Alignment System into measurement mode, the vehicle is rolled onto the sensor section (13) of the ramps (3 and 4). As the wheels (9 and 10) roll onto the ramps (3 and 4, respectively), they roll onto and over the sensor blades (16 and 45). Looking at the operation of the left ramp (3), as the wheel (9) rolls onto the sensor blade (16), the sensor blade (16) is depressed which releases the friction between the sensor blade (16) and the inside of the housing of the sensor section (13) and permits free lateral movement of the sensor blade (16) which is supported by its sensor blade roller tabs (21) which rest upon the sensor blade rollers (22). Lateral movement of the sensor blade (16) results in an electrical output from the linear analog sensor device (18) which is connected by the left linear sensor electrical signal cable (25) to the analog to digital interface with EPROM electronics (73) where such electrical outputs are converted to digital values which are provided by the analog to digital interface with EPROM electronics (73) to the computer (74). Operation of the right ramp (4) in the measurement mode is analogous. The computer (74), following receipt of the digital values which are provided by the analog to digital interface with EPROM electronics (73), acts in measurement mode to calculate and display the difference values of toe-in and/or toe-out readings on the color video monitor (71) as previously described. The computer (74), if instructed by the operator depressing the print command button (90) on the push button console (124), will cause the printer (72) to enter the print mode, see FIG. 35, and print out the toe-in and/or toe-out values.

Figure 14:
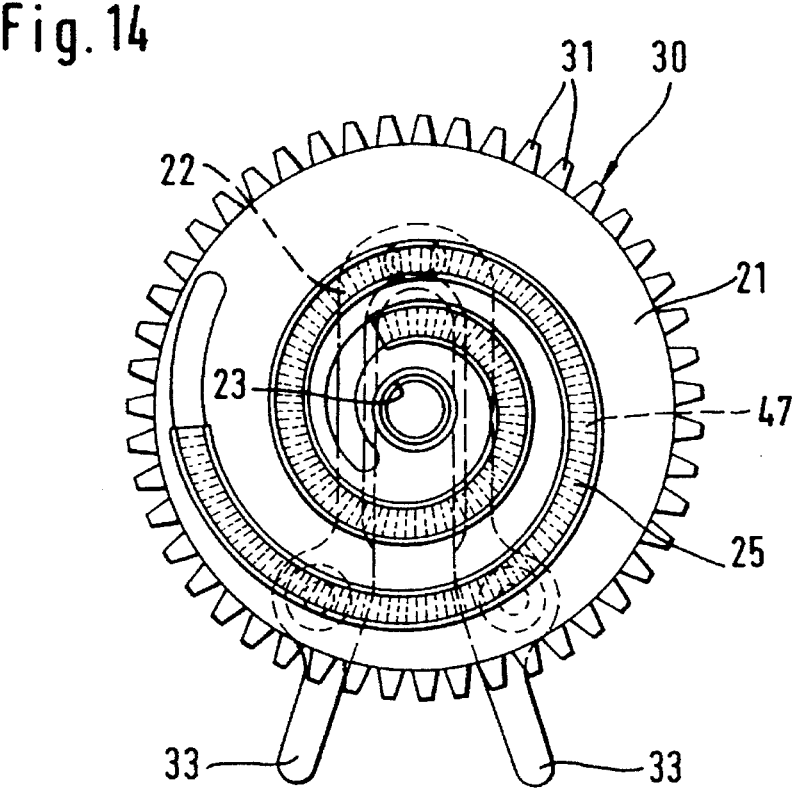
FIG. 14 is a cross-sectional view of the Steering Axis Inclination/Caster Tool of the instant invention attached to a strut, same being of the type sold under the trademark McPherson Strut.

The instant invention additionally provides a steering axis inclination/caster tool (135), see FIG. 14 where said tool (135) is shown attached to the upper, threaded part of the right front strut (49), same being of the type sold under the trademark McPherson Strut. The right front strut (49), same being of the type sold under the trademark McPherson Strut, is shown in FIG. 14 connected to the right front suspension housing (51) of a vehicle (8) by a strut, same being of the type sold under the trademark McPherson Strut, shaft (136) protruding through the right front suspension housing (51) secured by a spring retainer nut (52). The steering axis inclination/caster tool (135) comprises a three jaw self-centering device (56), which may as shown be a drill chuck, a steering axis inclination/caster tool housing (57), a steering axis inclination/caster tool sensor (58), a pin connector (59) which is rotatably mounted on a post (146) located in the center of the steering axis inclination/caster tool housing (57), an elastic line (55), and a friction fitting (60). The steering axis inclination/caster tool housing (57) provides a 90° window (138) or "cut out" in its circumference which permits the elastic line (55) to connect to the strut, same being of the type sold under the trademark McPherson Strut, shaft (136) protruding from the left front strut (48), same being of the type sold under the trademark McPherson Strut, while remaining attached to the pin connector 59) within the steering axis inclination/caster tool housing (57) when the steering axis inclination/caster tool housing (57) is rotated by 90°. The steering axis inclination/caster tool housing (57) is connected to the three jaw self-centering device (56) by a friction fitting (60), that is, the housing (57) is simply forced down over the three jaw self-centering device (56) into position after the three jaw self-centering device (56) is clamped into position on the strut, same being of the type sold under the trademark McPherson Strut, shaft (136) protruding from the left front strut (48), same being of the type sold under the trademark McPherson Strut. The friction fitting (60) allows for rotation of the steering axis inclination/caster tool housing (57), and the steering axis inclination/caster tool sensor (58) mounted inside, without disturbing the attachment of the three jaw self-centering device (56) to the strut, same being of the type sold under the trademark McPherson Strut, shaft (136). The steering axis inclination/caster tool sensor (58) is a silicone filled inclinometer which produces a voltage proportional to the number of degrees its axis is held away from true vertical.

Figure 4:
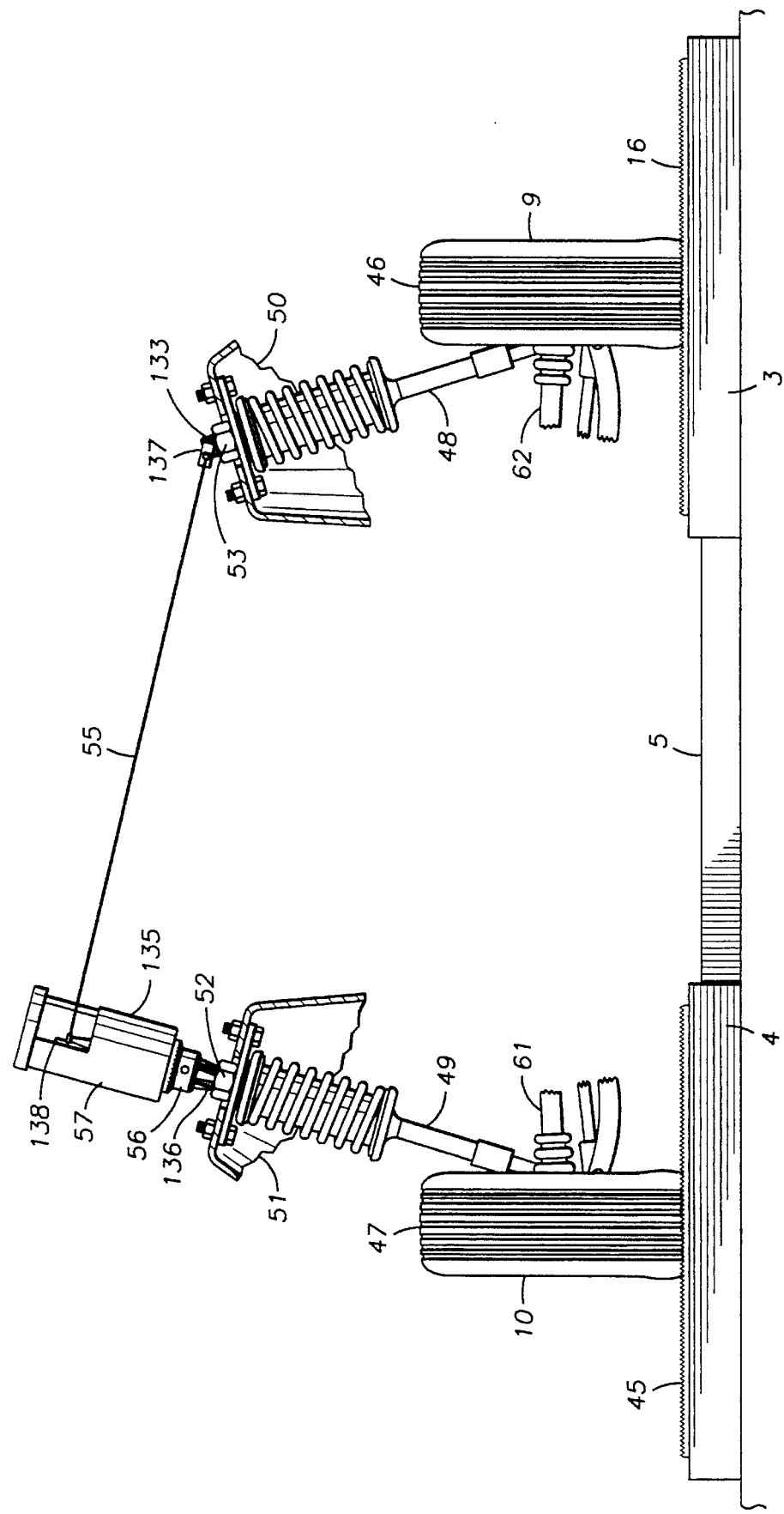
FIG. 4 is a partial elevational view of both ramps of the instant invention, additionally showing tires, and the Steering Axis Inclination/Caster Tool of the instant invention.

As seen in FIG. 4 and 14, the steering axis inclination/caster tool (135) is mounted along the axis of the right strut (49), same being of the type sold under the trademark McPherson Strut, attached by means of the three jaw self-centering device (56) to the threads on the strut, same being of the type sold under the trademark McPherson Strut, shaft (136) at the top of the right strut (49), same being of the type sold under the trademark McPherson Strut, and the elastic line (55) which connects to the pin connector (59) in the steering axis inclination/caster tool housing (57) at one end and to the bolt (53) at the top of the left strut (48), same being of the type sold under the trademark McPherson Strut, at the other end by means of a clamp (137). The clamp (137) can be replaced by a magnet (not shown).

Figure 32:
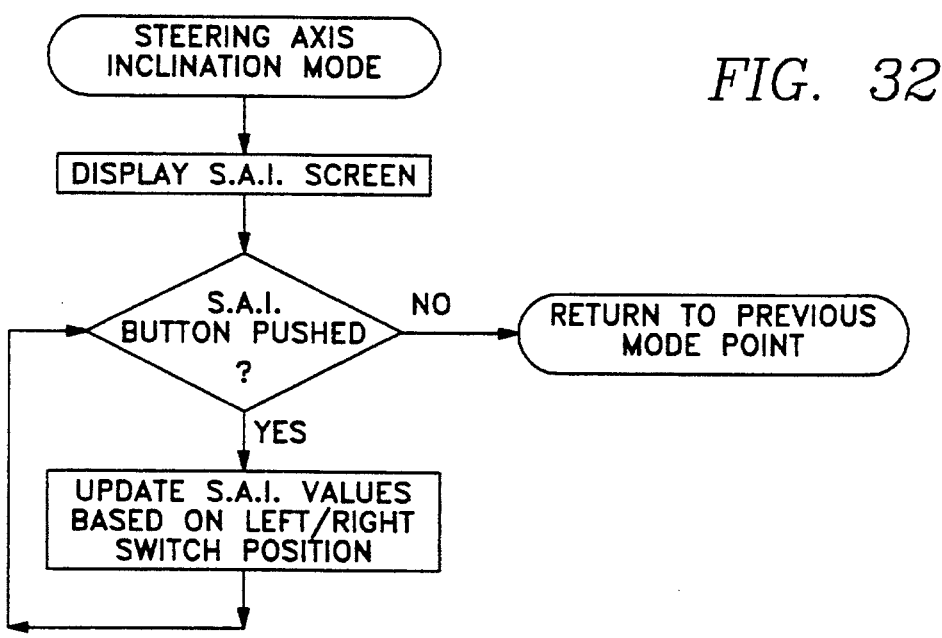
FIG. 32 is a flow diagram of the operation of the steering axis inclination mode of the instant invention.
Figure 33:
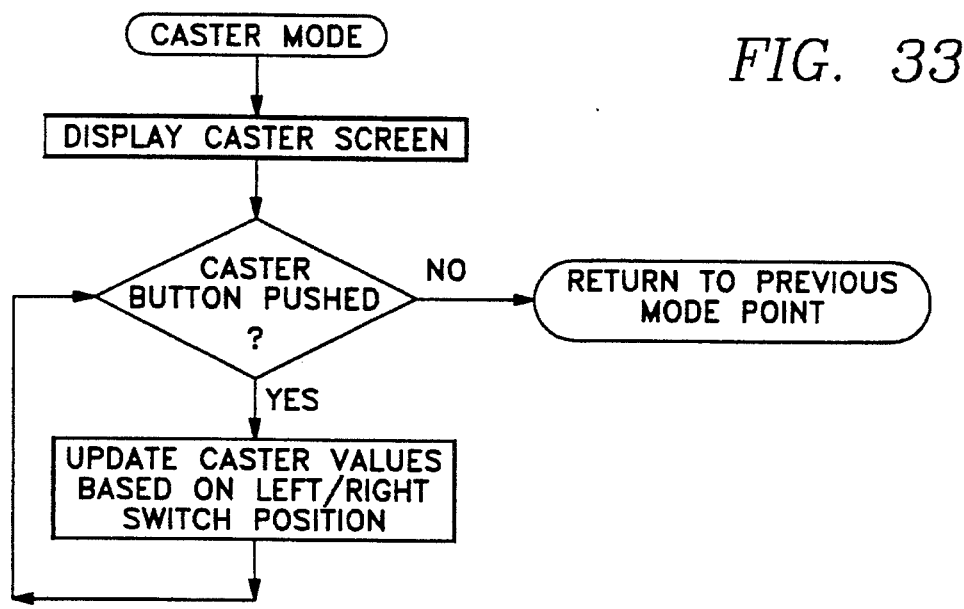
FIG. 33 is a flow diagram of the operation of the caster mode of the instant invention.

The steering axis inclination/caster tool (135) may be used as either a steering axis inclination sensor or rotated 90° and used as a caster sensor. Steering axis inclination readings are selected by depressing the steering axis inclination mode button (168), see FIG. 32, and caster readings are selected by depressing the caster mode button (167), see FIG. 33, on the push button control panel (124). The steering axis inclination/caster tool housing (57) has marked on its exterior a "C" at one edge of the 90° window (138) and a "S" at the opposite edge of the 90° window (138) so that the operator will know which way to rotate, see FIGS. 15 and 16, the steering axis inclination/caster tool housing (57) to obtain the desired reading, either steering axis inclination or caster. The steering axis inclination/caster tool (135) may be mounted on the left strut 48), same being of the type sold under the trademark McPherson Strut, with elastic line (55) attached to the right strut (49), same being of the type sold under the trademark McPherson Strut, to obtain steering axis inclination and caster readings for the left front wheel (9).

Figure 20:
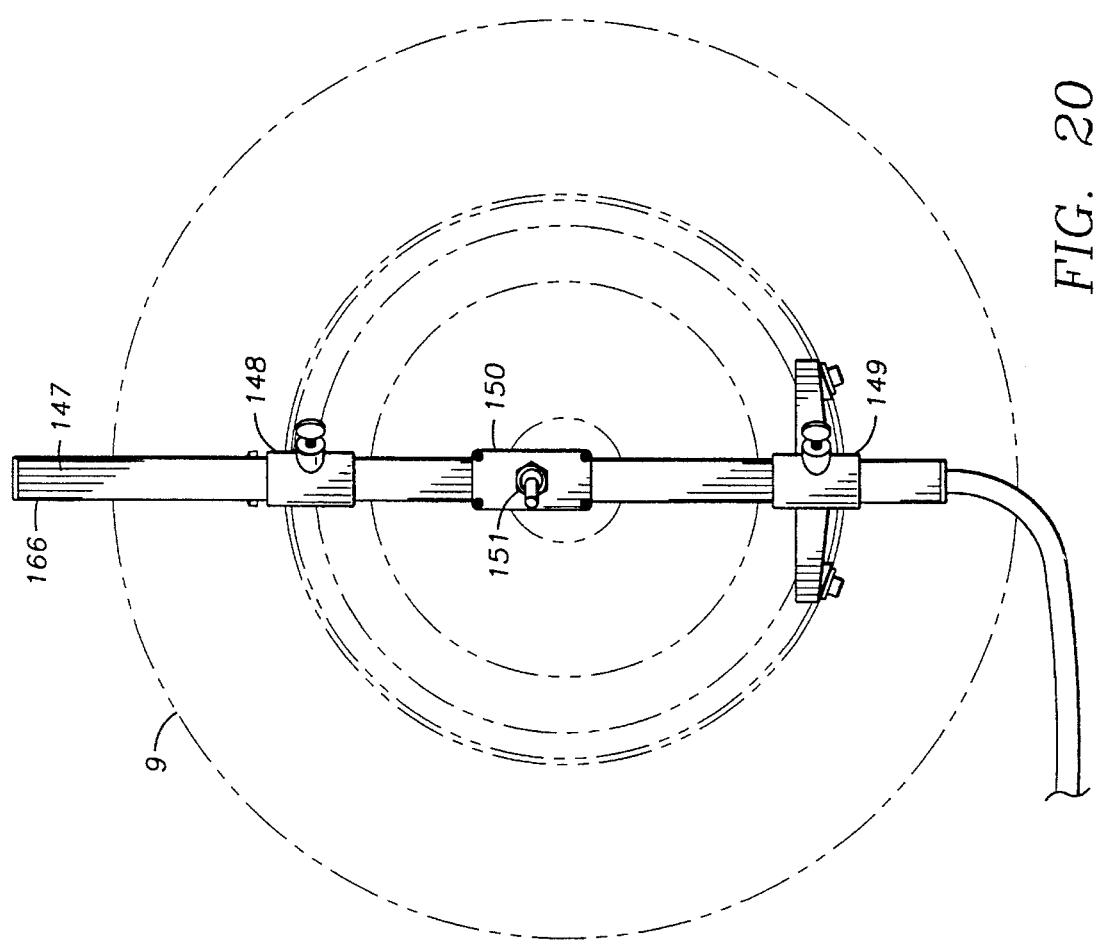
FIG. 20 is a horizontal elevation of the Camber Tool of the instant invention, rotated 90° from the view in FIG. 19.
Figure 19:
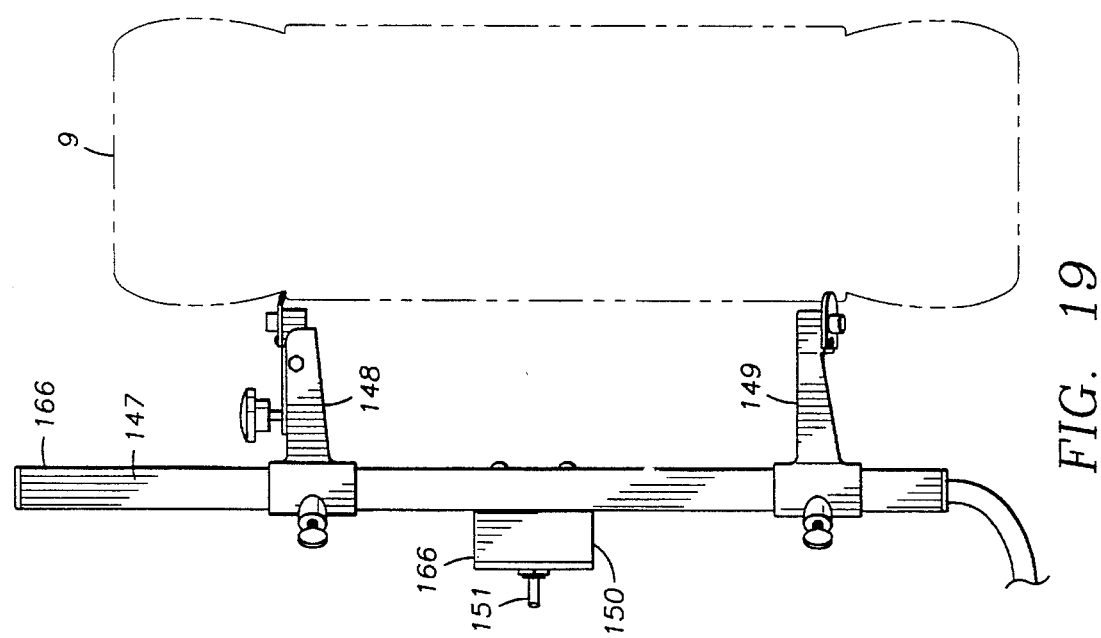
FIG. 19 is a horizontal elevation of the Camber Tool of the instant invention.
Figure 31:
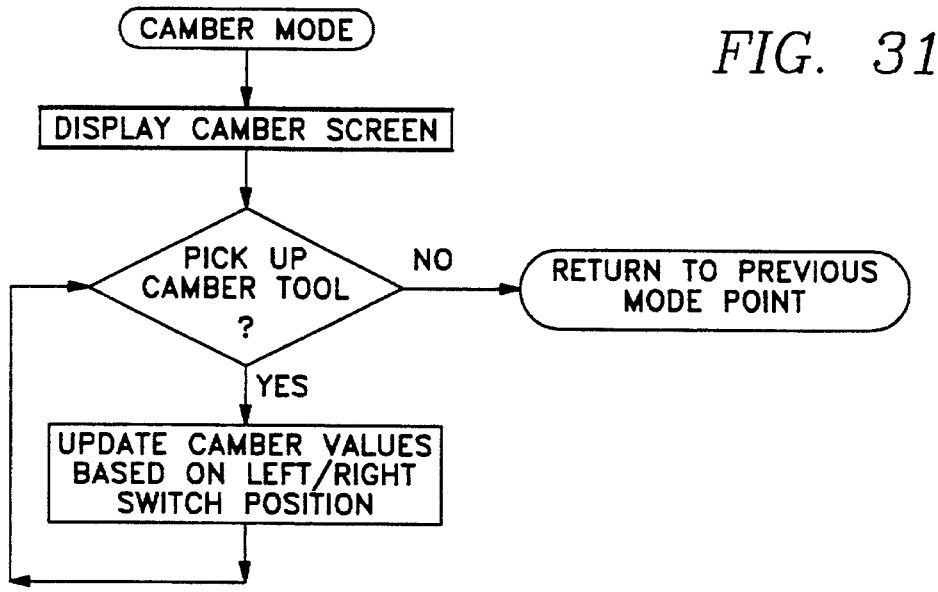
FIG. 31 is a flow diagram of the operation of the camber mode routine of the instant invention.

The instant invention additionally provides a camber tool (166), see FIGS. 19 and 20, which comprises a square tubing (147), which is attached in vertical position to a wheel (9 or 10) by means of an upper bracket (148) and a lower bracket (149), and further comprises an inclinometer (154) and a three position electrical toggle switch (151). When being used to obtain camber measurements, the camber tool (166) has its three position electrical toggle switch (151) in a non-neutral position. The three position electrical toggle switch (151) is toggled in the driving direction of the vehicle (8) for readings on both the left wheel (9) and the right wheel (10. The three position electrical toggle switch (151) sends a signal to the computer (74) indicating which wheel (9 or 10) is having its camber measurement taken, or indicating that no camber measurement is being taken if the three position electrical toggle switch (151) is in the neutral position. The inclinometer (154) is contained within an inclinometer housing (150) which also contains a mercury switch (152). The mercury switch (152) sends a signal to the computer (74) which indicates when, and whether, the camber tool (166) is attached to a wheel (9 or 10) in a true vertical position and, if so, the computer (74) then switches the display on the color video monitor (71) to a camber mode, see FIG. 31, display from a scuff mode, see FIG. 30, display and enables readings from the inclinometer (154) to be displayed.

Figure 22:
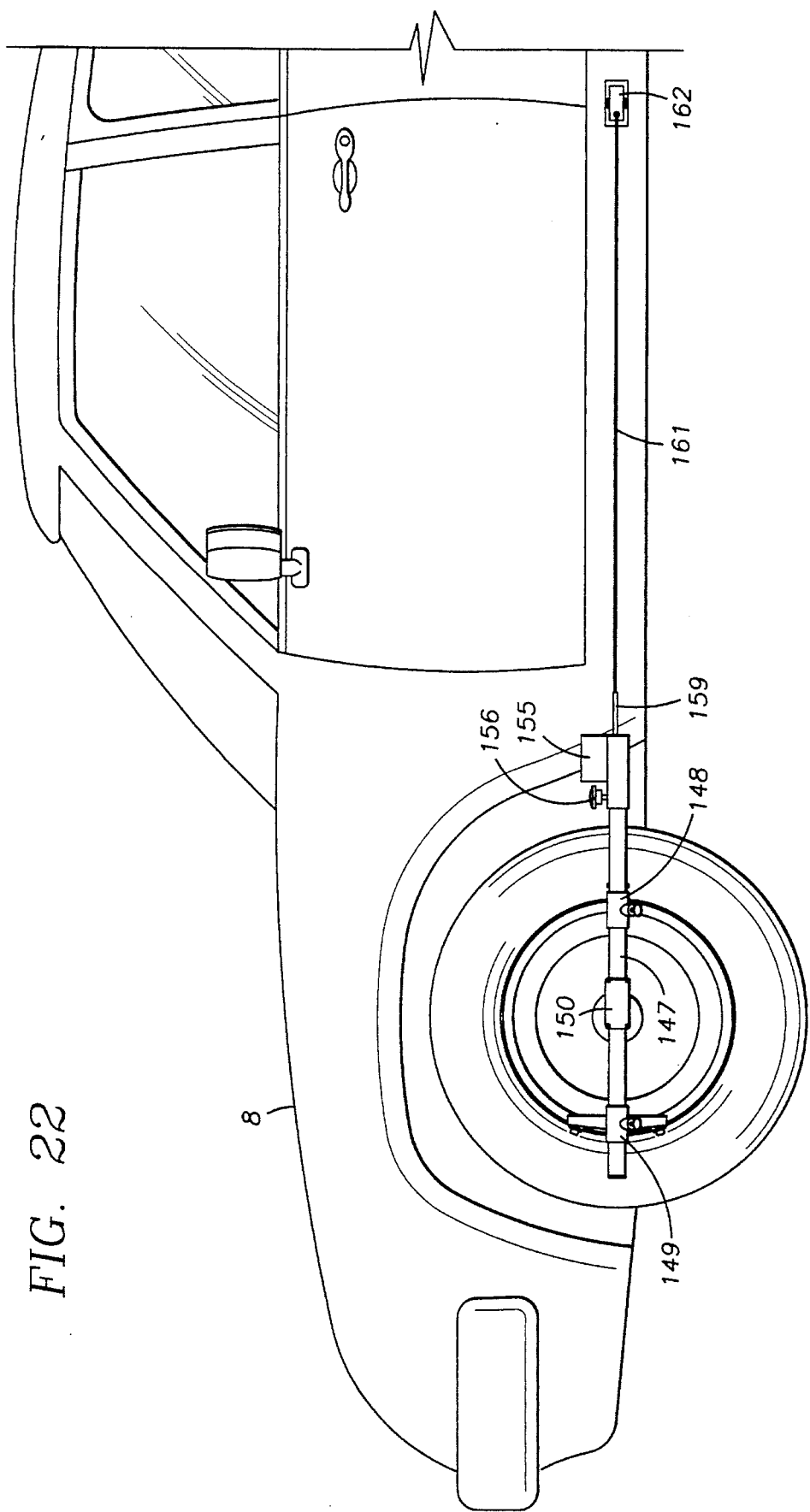
FIG. 22 is a horizontal elevation of the Straight Steering Wheel Tool of the instant invention attached to the wheel of a vehicle for use.
Figure 34:
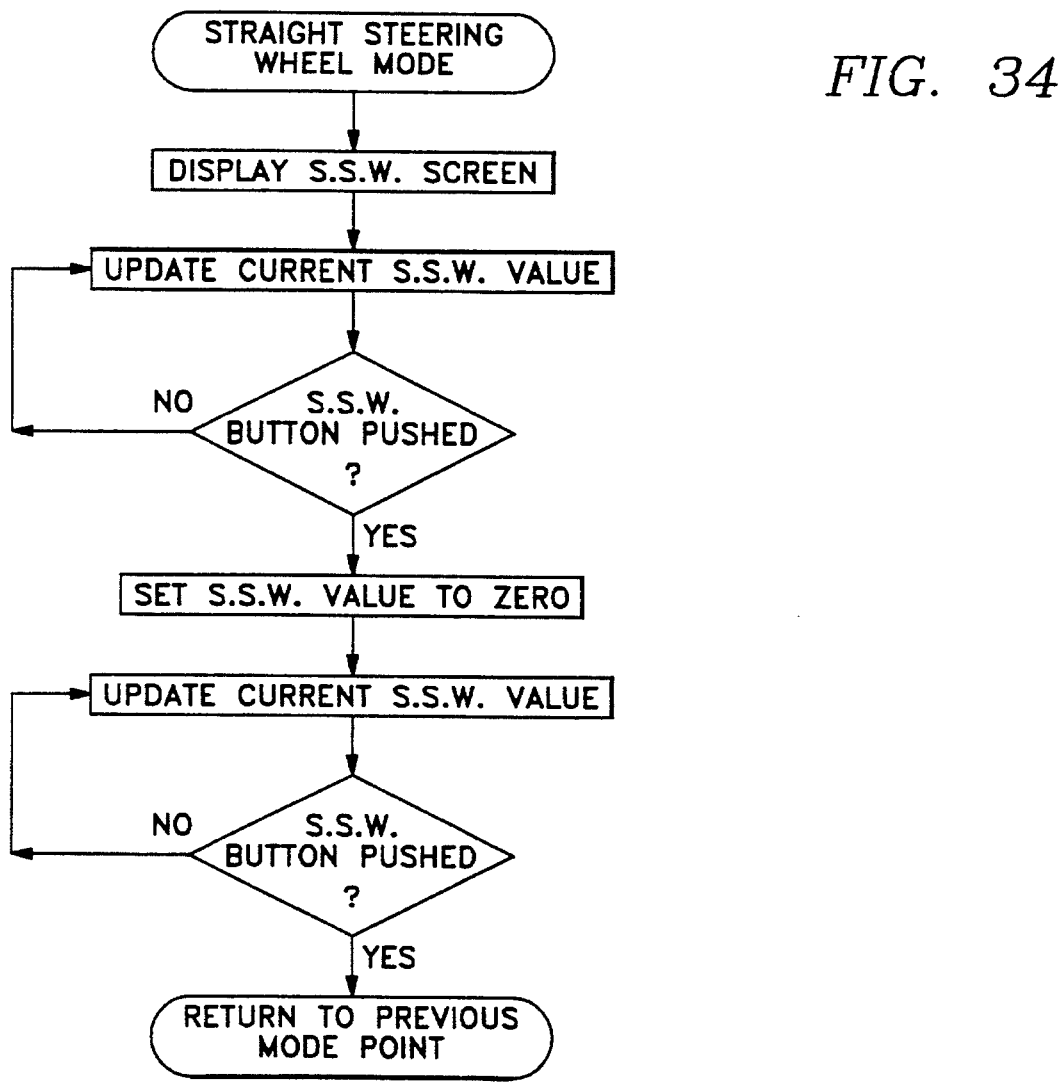
FIG. 34 is a flow diagram of the operation of the straight steering wheel mode of the instant invention.

The instant invention, in the straight steering wheel mode, FIG. 34, additionally provides a straight steering wheel tool (170), FIG. 22, which comprises a camber tool (166) mounted on a wheel (9 or 10) in a horizontal position used as a support for the straight steering wheel sensor housing (155). The straight steering wheel sensor housing (155) contains, see FIGS. 23 and 24, a straight steering wheel sensor (157) which acts as a rotary position indicator. The straight steering wheel sensor housing (155) is attached to the camber tool (166) by sliding the straight steering wheel sensor housing (155) onto the square tubing (147) until impeded by the stop screw (163), at which time the sensor arm attachment screw (160) is tightened down to hold the straight steering wheel sensor housing (155) firmly in position. After attachment of the straight steering wheel sensor housing (155) to the square tube (147) of the horizontally mounted camber tool (166), the elastic line (161) is attached by means of an elastic line attachment magnet (162) to the side of the vehicle (8) under slight tension.

Figure 25:
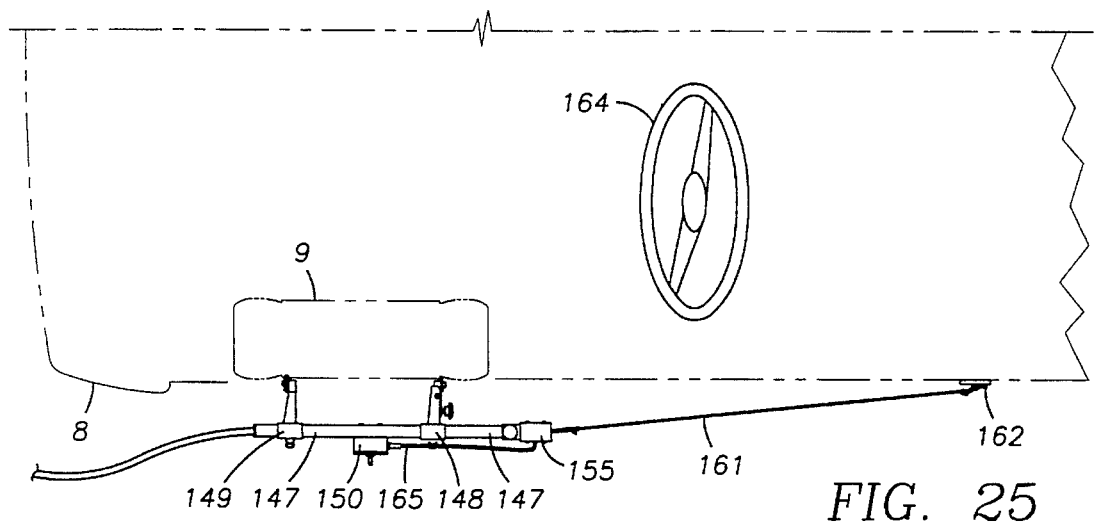
FIG. 25 is a schematic view of the Straight Steering Wheel Tool of the instant invention attached to the wheel of a vehicle when the wheel is straight and the steering wheel of the vehicle is crooked.
Figure 26:
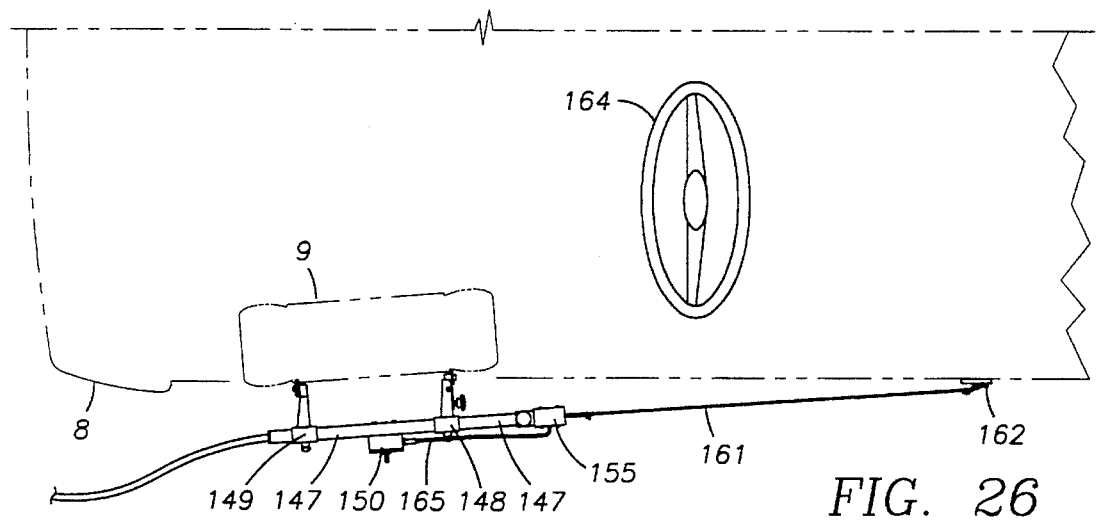
FIG. 26 is a schematic view of the Straight Steering Wheel Tool of the instant invention attached to the wheel of a vehicle when the wheel is crooked and the steering wheel of the vehicle is straight.
Figure 27:
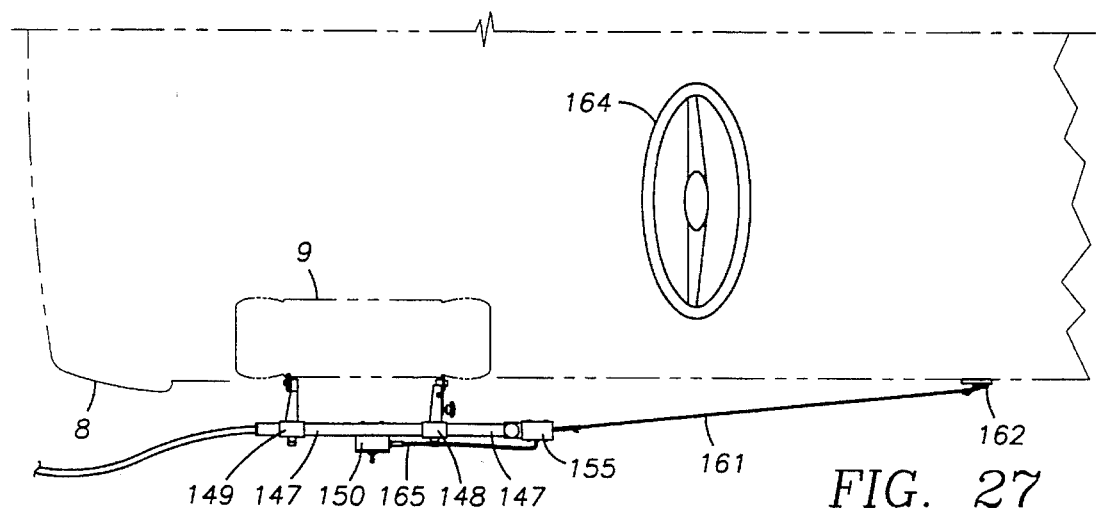
FIG. 27 is a schematic view of the Straight Steering Wheel Tool of the instant invention attached to the wheel of a vehicle when the wheel is straight and the steering wheel of the vehicle is straight.

In operation, the straight steering wheel tool (170) is mounted on a wheel (9 or 10) while the wheel (9 or 10) is pointing straight ahead, but the vehicle steering wheel (164) may be crooked, see FIG. 25. At this time and while the straight steering wheel tool (170), wheel (9 or 10), and vehicle steering wheel (164) are in this condition, the straight steering wheel indicator mode button (169) on the push button control panel (124) is depressed, causing the computer (74) to read from the straight steering wheel sensor (157) a reference or "zero" value and to display that "zero" on the color video monitor (71). The operator next moves the vehicle steering wheel (164) to a level position, causing the wheels (9 and 10) to move away from straight ahead, and causing the computer (74) to display a number proportional to the deviation of the rotational alignment of the vehicle steering wheel (164) from the wheels (9 and 10). While maintaining the vehicle steering wheel (164) in a level position, the operator then adjusts the manufacturer's adjustment collars which are mounted on the steering control rod to bring the wheels (9 and 10) to a straight ahead position. The adjustment of the manufacturer's adjustment collars is facilitated by reading the numbers indicated on the color video monitor (71) which numbers come down to "zero" as the wheels (9 and 10) are brought to a straight ahead position.

This invention and its operation have been described in terms of a single preferred embodiment, however numerous embodiments are possible without departing from the essential characteristics thereof. Accordingly, the description has been illustrative and not restrictive as the scope of the invention is defined by the appended claims, not by the description preceding them, and all changes and modifications that fall within the stated claims or form their functional equivalents are intended to be embraced by the claims.

I claim:

1. A dynamic wheel alignment apparatus for the measurement of toe for each of two tired wheels on any one of a vehicle's axles while the said two tired wheels of said vehicle are driven over two parallel ramps, a right wheel ramp and a left wheel ramp, which provide, in the top surface of each of said ramps, transverse to said ramp's length, a slot within which is located a laterally moveable serrated sensor blade to interact with the footprint of a tired wheel being driven over said sensor blade, wherein:

each of said ramps provides a lateral movement measurement means to measure the lateral movement of said sensor blade when a tired wheel is being driven over said sensor blade, and each of said ramps provides a reset mechanism to set said sensor blade to an initial or reference position before a tired wheel is driven over said sensor blade; and wherein said reset means comprises:
a rectangular sensor blade tab which is mechanically connected to said sensor blade, said sensor blade tab providing a reset mechanism centering slot,
an air cylinder,
a swivel mechanism base plate,
a left vertical arm of said swivel mechanism,
a right vertical arm of said swivel mechanism,
a swivel mechanism stabilizer pin,
a clevis housing, and
a clevis pin,
wherein:

said air cylinder is mechanically connected to the interior of said ramp sensor section housing, said air cylinder's shaft is mechanically connected to said clevis housing, said clevis pin is mechanically connected to said swivel mechanism base plate, said swivel mechanism base plate has mechanically attached to it and extending vertically from said swivel mechanism base plate's upper surface said swivel mechanism stabilizer pin, said swivel mechanism stabilizer pin extends vertically through said reset mechanism centering slot in said sensor blade tab, said swivel mechanism base plate has mechanically attached to it and extending vertically from said swivel mechanism base plate's upper surface and to the left side of said sensor blade tab said left vertical arm of said swivel mechanism, and said swivel mechanism base plate has mechanically attached to it and extending vertically from said swivel mechanism base plate's upper surface and to the right side of said sensor blade tab said right vertical arm of said swivel mechanism, and, further, wherein:

said air cylinder's shaft, when retracted, acts to rotate said clevis housing, causing said left vertical arm of said swivel mechanism to assert force on the left side of said sensor blade tab and said right vertical arm of said swivel mechanism to assert force on the right side of said sensor blade tab, centering said sensor blade tab and thus laterally positioning said sensor blade in, and resetting said sensor blade to, a reliable, repeatable initial or reference position, and said air cylinder's shaft, when extended, acts to rotate said clevis housing, causing said left vertical arm of said swivel mechanism to move away from the left side of said sensor blade tab and said right vertical arm of said swivel mechanism to move away from the right side of said sensor blade tab, freeing said sensor blade tab from lateral forces and thus freeing said sensor blade for lateral movement when a tired wheel is being driven over it.

2. The apparatus of claim 1 wherein the output of said lateral movement measurement means is an electrical signal proportional to the lateral movement of said sensor blade, wherein:

said electrical signal is input to an analog to digital converter which has as an output a digital value proportional to the lateral movement of said sensor blade, said output being input to a computer which performs a comparison between said digital value when said sensor blade is in said reference position and said digital value when said sensor blade has been driven over by a tired wheel and which generates a video signal containing information relative to said comparison, said video signal being output from said computer to a video monitor creating a display on said video monitor which contains and visually displays information relative to said comparison.

3. A dynamic wheel alignment apparatus for the measurement of toe for each of two tired wheels on any one of a vehicle's axles while the said two tired wheels of said vehicle are driven over two parallel ramps, a right wheel ramp and a left wheel ramp, which provide, in the top surface of each of said ramps, transverse to said ramp's length, a slot within which is located a laterally moveable serrated sensor blade to interact with the footprint of a tired wheel being driven over said sensor blade, wherein:

each of said ramps provides a lateral movement measurement means to measure the lateral movement of said sensor blade when a tired wheel is being driven over said sensor blade, and each of said ramps provides a reset mechanism to set said sensor blade to an initial or reference position before a tired wheel is driven over said sensor blade;

wherein said reset means comprises:
a "V" cut in said sensor blade,
two air cylinders, and
a ram;

wherein said ram comprises:
a solid cylindrical head piece,
a ram shaft, and
a ram fastener end;

wherein said ram shaft is connected on one end to the circumference of said solid cylindrical head piece, and wherein said ram shaft is connected on its end opposite said solid cylindrical head piece to a ram fastener end; and wherein each of said air cylinders provides a cylinder body and a cylinder shaft, said air cylinders are aligned such that said cylinder shafts are parallel, said air cylinders' bodies are mechanically connected to one another, said air cylinders' bodies are mechanically connected to one of said ramps, and said air cylinders' shafts are mechanically connected to said ram fastener end;

whereby said ram shaft is precluded from rotating; and whereby, when said air cylinder shafts are extended, said solid cylindrical head piece is forced into said "V" cut, applying lateral forces on and thus laterally positioning said sensor blade in, and resetting said sensor blade to, a reliable, repeatable initial or reference position; and whereby, when said air cylinder shafts are retracted, said solid cylindrical head piece is retracted from said "V" cut freeing said sensor blade tab from lateral forces and thus freeing said sensor blade for lateral movement when a tired wheel is being driven over it.

\* \* \* \* \*